United States Patent
Paudel et al.

(10) Patent No.: US 12,462,462 B2
(45) Date of Patent: Nov. 4, 2025

(54) EARLY TERMINATION OF GRAPHICS SHADERS

(71) Applicant: QUALCOMM Incorporated, San Diego, CA (US)

(72) Inventors: Jeeva Paudel, Davis, CA (US); Chunling Hu, Campbell, CA (US); Yue Tang, Livermore, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/323,381

(22) Filed: May 24, 2023

(65) Prior Publication Data

US 2024/0394951 A1 Nov. 28, 2024

(51) Int. Cl.
*G06T 15/00* (2011.01)
*G06T 1/20* (2006.01)

(52) U.S. Cl.
CPC ............ *G06T 15/005* (2013.01); *G06T 1/20* (2013.01)

(58) Field of Classification Search
CPC ............................... G06T 11/00; H04N 5/265
See application file for complete search history.

(56) References Cited

U.S. PATENT DOCUMENTS

| | | | | |
|---|---|---|---|---|
| 2005/0134879 A1* | 6/2005 | Fuchs | ............... | H04N 1/6033 358/1.9 |
| 2009/0259996 A1* | 10/2009 | Grover | ............... | G06F 8/456 717/136 |
| 2018/0293761 A1* | 10/2018 | Ceylan | ............... | G06T 15/005 |
| 2020/0174761 A1 | 6/2020 | Favela et al. | | |
| 2023/0104199 A1* | 4/2023 | Volkov | ............... | G06T 15/06 345/426 |
| 2023/0298255 A1* | 9/2023 | Benthin | ............... | G06T 15/06 345/426 |
| 2023/0334360 A1* | 10/2023 | Kormilitsin | ......... | G06F 18/2115 |
| 2024/0320782 A1* | 9/2024 | Tessari | ............... | G06T 15/005 |

OTHER PUBLICATIONS

Anonymous: "Why use "Return" At the End of "Void" Functions?—Unreal Courses / Talk—GameDev.tv", Jun. 22, 2017, pp. 1-2, XP093191075, p. 2.
International Search Report and Written Opinion—PCT/US2024/027044—ISA/EPO—Aug. 9, 2024.
Kessenich J., et al., "The OpenGL Shading Language", Khronos Organisation, Feb. 7, 2013, XP093190926, pp. 108-109, 199 Pages.

* cited by examiner

*Primary Examiner* — Kee M Tung
*Assistant Examiner* — Khoa Vu
(74) *Attorney, Agent, or Firm* — Procopio, Cory, Hargreaves & Savitch LLP

(57) ABSTRACT

Aspects presented herein relate to methods and devices for graphics processing including an apparatus, e.g., a graphics processing unit (GPU). The apparatus may detect an existence of a shader termination construct for at least one graphics shader. The apparatus may also perform a first static analysis for an identification of a set of suitable candidates for a control flow delinearization associated with the shader termination construct. Further, the apparatus may perform a second static analysis for a cost modeling procedure for the set of suitable candidates for the control flow delinearization. The apparatus may also select, based on the cost modeling procedure, a candidate of the set of suitable candidates for the control flow delinearization. The apparatus may also provide an indication of the selected candidate of the set of suitable candidates for the control flow delinearization.

26 Claims, 17 Drawing Sheets

```
// Fragment Shader
void main() {
    vec2 depth = vec2(0.13, 0.13);
    vec2 scale = vec2(10.0, 10.0);

float ss = fract(gl_TexCoord[0].x * scale.x);
    float tt = fract(gl_TexCoord[0].y * scale.y);

bool shouldSkip = (ss > depth.x) || (tt > depth.y);

if (shouldSkip)
        discard;

gl_FragColor = vec4(1.0, 0.0, 0.0, 0.0);
    return;
}
```

FIG. 7

```
800
1  extern func1 ( float );
2  extern func2 ( float );
3
4  void myFunc ( float outColor .x,
5      float outColor .y) {
6  bool cond1 = func1 ( outColor .x);
7  bool cond2 = func2 ( outColor .y);
8  ...
9  if ( cond1 || cond2 ) {
10     S1;
11     S2;
12     ...
13     discard;
14  }
15  ...
22  }
```

```
810
1  extern func1 ( float );
2  extern func2 ( float );
3
4  void myFunc ( float outColor .x,
5      float outColor .y) {
6  bool cond1 = func1 ( outColor .x);
7  ...
8  if ( cond1 ) {
9      S1;
10     S2;
11     ...
12     discard;
13  }
14  bool cond2 = func2 ( outColor .y);
15  if ( cond2 ) {
16     S1;
17     S2;
18     ...
19     discard;
20  }
21  ...
22  }
```

FIG. 8

```
// Fragment Shader
void main() { vec2 depth = vec2(0.13, 0.13);
    vec2 scale = vec2(10.0, 10.0);

float ss = fract(gl_TexCoord[0].x * scale.x);
    if (ss > depth.x)
        discard;

float tt = fract(gl_TexCoord[0].y * scale.y);
    if (tt > depth.y)
        discard;

gl_FragColor = vec4(1.0, 0.0, 0.0, 0.0);

return;
}
```

FIG. 9

```
1   void myFunc ( float outColor .x,
2       float outColor .y,
3       float outColor .z) {
4   ...
5   if ((outColor .x *
6       outColor .y *
7       outColor .z) == 0) {
8       discard;
9   }
10
11
12
13
14
15  ...
16  return void ;
17  }
18
```

1000

```
1   void myFunc ( float outColor .x,
2       float outColor .y,
3       float outColor .z) {
4   ...
5   if ( outColor .x == 0) {
6       discard;
7   }
8
9   if ( outColor .y == 0) {
10      discard;
11  }
12
13  if ( outColor .z == 0) {
14      discard;
15  }
16  ...
17  return void ;
18  }
```

```
1   void myFunc ( float tc.x,
2         float tc.y,
3         float tc.z) {
4
5   bool val1 = tc.x < 0.00;
6   bool val2 = (! val1 ) ? (tc.x > 1.00) : val1 ;
7   bool val3 = (! val2 ) ? (tc.y < 0.00) : val2 ;
8   bool val4 = (! val3 ) ? (tc.y > 1.00) : val3 ;
9   bool val5 = (! val4 ) ? (tc.z < 0.00) : val4 ;
10  bool val6 = (! val5 ) ? (tc.z > 1.00) : val5 ;
11
12  if( val6 )
13       discard;
14
15  ...
16  ...
17
18
19
20  return void ;
21  }
```

1100

```
1   void myFunc ( float tc.x,
2         float tc.y,
3         float tc.z) {
4
5   if (tc.x < 0.00)
6        discard;
7   if (tc.x > 1.00)
8        discard;
9   if (tc.y < 0.00)
10       discard;
11  if (tc.y > 1.00)
12       discard;
13  if (tc.z < 0.00)
14       discard;
15  if (tc.z > 1.00)
16       discard;
17
18  ...
19  ...
20  return void ;
21  }
```

```
1   ...
2   lt dr1.x, dr2.y, (0.0);
3   gt dr2.x, dr2.y, (1.0);
4   lt dr3.x, dr2.z, (0.0);
5   or dr1.x, dr1.x, dr2.x;
6   gt dr2.x, dr2.z, (1.0);
7   mv hr6.x, dr3.x;
8   mv hr2.x, dr1.x;
9   mv hr2.y, dr2.x;
10  lt dr2.x, dr2.w, (0.0);
11  sel hr2.x, hr2.x, hr2.x, hr6.x;
12  mv hr4.x, dr2.x;
13  or hr2.x, hr2.x, hr2.y;
14  gt dr3.x, dr2.w, (1.0);
15  or hr2.x, hr2.x, hr4.x;
16  mv hr2.y, dr3.x;
17  and hr2.x, hr2.x, 255;
18  or SR, hr2.x, hr2.y;
19  discard SR;
```

1200

```
1   ...
2   lt SR, dr2.y, (0.0);
3   discard SR;
4   gt SR, dr2.y, (1.0);
5   discard SR;
6   lt SR, dr2.z, (0.0);
7   discard SR;
8   gt SR, dr2.z, (1.0);
9   discard SR;
10  lt SR, dr2.w, (0.0);
11  discard SR;
12  gt SR, dr2.w, (1.0);
13  discard SR;
14  ...
```

```
1   ...
2   add dr0.w, c0.x, -dr0.w;
3   add dr0.x, c0.z, -dr0.x;
4   absneg dr0.w, dr0.w;
5   absneg dr1.x, dr1.x;
6   absneg dr0.x, dr0.x;
7   mv hr0.w, dr0.w;
8   mv hr1.z, dr1.x;
9   mv hr0.x, dr0.x;
10  fma hr0.y, -hc1.x, hr0.w, hc20.z;
11  fma hr0.w, -hc1.y, hr1.z, hc20.z;
12  fma hr0.x, -hc1.z, hr0.x, hc20.z;
13  mul hr0.y, hr0.y, hr0.w;
14  mul hr0.w, hr0.x, hr0.y;
15  eq SR, hr0.w, 0.0;
16  discard SR;
```

1300

```
1   ...
2   add dr0.y, c0.x, -r0.y;
3   add dr1.y, c0.y, -r1.y;
4   add dr0.x, c0.z, -r0.x;
5   absneg dr0.y, dr0.y;
6   mv hr0.z, dr0.y;
7   fma hr4.x, -hc1.x, hr0.z, hc20.z;
8   eq SR, hr4.x, 0.0;
9   discard SR;
10  absneg dr0.y, dr1.y;
11  mv hr0.z, dr0.y;
12  fma hr4.y, -hc1.y, hr0.z, hc20.z;
13  eq SR, hr4.y, 0.0;
14  discard SR;
15  absneg dr0.x, dr0.x;
16  mv hr0.x, dr0.x;
17  fma hr4.z, -hc1.z, hr0.x, hc20.z;
18  eq SR, hr4.z, 0.0;
19  discard SR;
```

EARLY TERMINATION OF GRAPHICS SHADERS

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform for graphics processing. The apparatus may detect an existence of a shader termination construct for at least one graphics shader. The apparatus may also perform a first static analysis for an identification of a set of suitable candidates for a control flow delinearization associated with the shader termination construct. Further, the apparatus may perform a second static analysis for a cost modeling procedure for the set of suitable candidates for the control flow delinearization. The apparatus may also select, based on the cost modeling procedure, a candidate of the set of suitable candidates for the control flow delinearization. Also, the apparatus may also perform an iterative fission process or a delinearization on the selected candidate of the set of suitable candidates for the control flow delinearization. The apparatus may also provide an indication of the selected candidate of the set of suitable candidates for the control flow delinearization. The apparatus may also reselect, based on the selected candidate, a second candidate of the set of suitable candidates for the control flow delinearization based on the cost modeling procedure. The apparatus may also provide an indication of the reselected second candidate of the set of suitable candidates of the control flow delinearization.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7 is a diagram illustrating example code for graphics operations.

FIG. 8 is a diagram illustrating example code for graphics operations.

FIG. 9 is a diagram illustrating example code for graphics operations.

FIG. 10 is a diagram illustrating example code for graphics operations.

FIG. 11 is a diagram illustrating example code for graphics operations.

FIG. 12 is a diagram illustrating example code for graphics operations.

FIG. 13 is a diagram illustrating example code for graphics operations.

DETAILED DESCRIPTION

Figure 1:
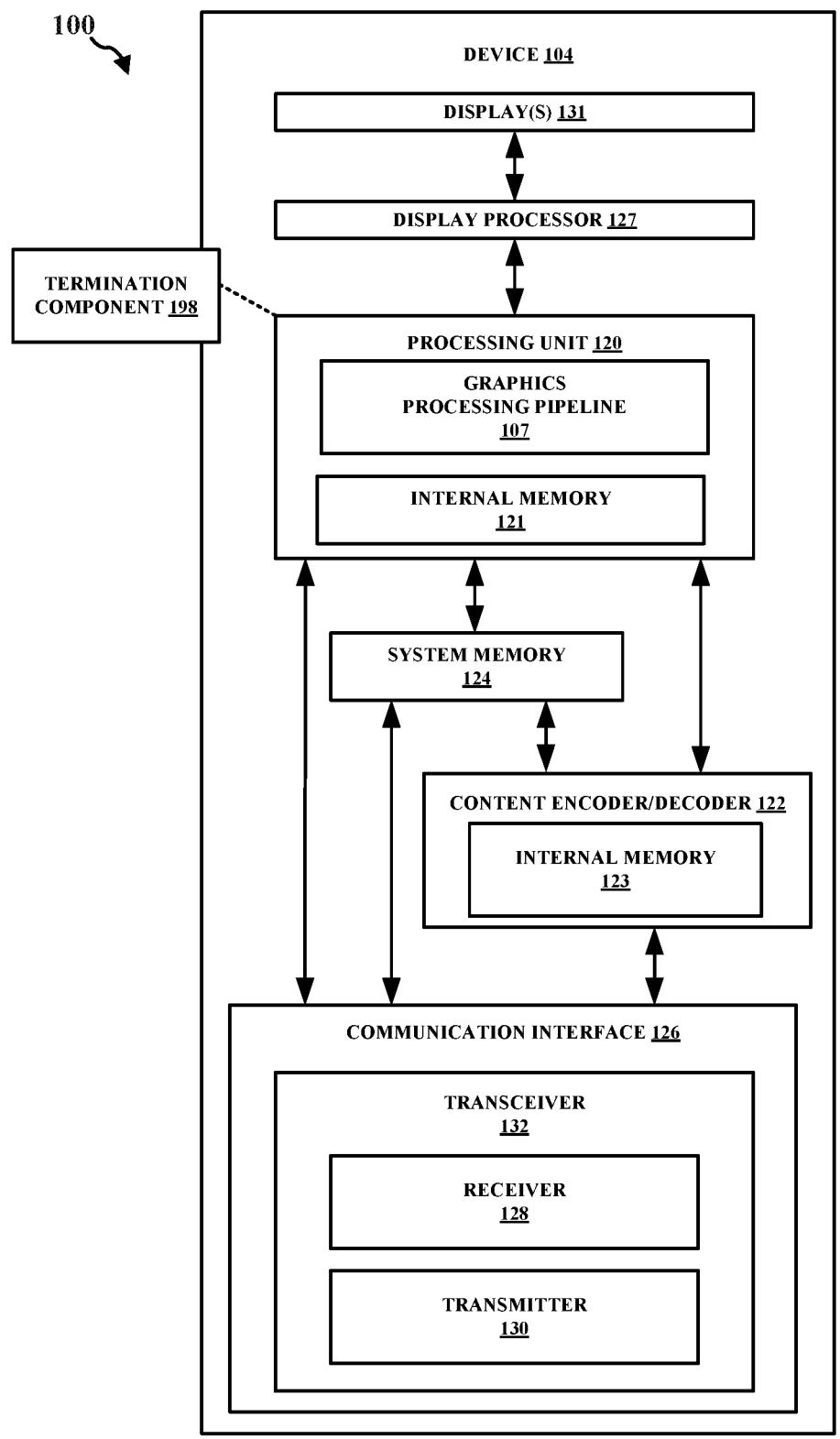
FIG. 1 is a block diagram that illustrates an example content generation system.

In some aspects, divergence in a graphics control-flow (e.g., divergence introduced by certain branches or branch instructions) may inhibit certain types of efficient graphics instructions (e.g., instruction-level parallelism). As such, compilers may employ certain conversion techniques (e.g., if-conversion) to transform an acyclic control flow graph into an enlarged basic block of predicated instructions. However, while if-conversion may expose instruction-level parallelism within graphics processing, speculative and predicated execution from if-conversion may incur the processor overhead of fetching and executing instructions even if their results remain unused. In graphics applications with multiple-pass (multi-pass) shaders, the overhead of speculative and predicated execution may be large. This may be especially true in the presence of early-termination constructs (e.g., a discard construct) in divergent paths of the graphics control flow. In some aspects, compiling a graphics application for early termination of shaders to avoid redundant work, as well as exploiting instruction-level parallelism, may present a dilemma. For instance, if-conversion may be most effective upon exposing maximal instructions in a block to facilitate parallelism. Moreover, a compiler's scheduling of discard may be most performant upon precluding maximal instructions from execution (i.e., the instructions that would eventually become redundant upon shader termination). These competing optimization goals may necessitate a delicate balance that is tightly coupled with processor architecture and the characteristics of conditional branches in the shader code. Aspects of the present disclosure may allow shader instructions to be terminated (i.e., terminated early) before any redundant computations. Aspects presented herein may do so by allowing compilers to schedule shader termination instructions early in a scheduling queue for graphics instructions. For example, aspects presented herein may contribute techniques for enabling compilers to schedule shader termination instructions earlier in the scheduling queue compared to other approaches. For instance, the ensuing reduction in the number of instructions executed by a shader before termination may allow aspects presented herein to yield significant performance benefits. Aspects presented herein may also provide a cost-model driven fission of if-conditionals as an effective and practical mechanism to enable scheduling of shader termination constructs early in the instruction queue. By doing so, aspects presented herein may reduce the amount of redundant work associated with shader instructions. Aspects presented herein may result in performance evaluations that indicate a significant reduction in work when terminating shader instructions early. For example, aspects presented herein may provide a reduction in dynamic execution count of certain instructions in graphics shaders (e.g., arithmetic logic unit (ALU) instructions and texture instructions).

Aspects presented herein may include a number of benefits or advantages. For instance, aspects presented herein may allow shader instructions to be terminated (i.e., terminated early) before any redundant computations. Aspects presented herein may do so by allowing compilers to schedule shader termination instructions early in a scheduling queue for graphics instructions. For example, aspects presented herein may contribute techniques for enabling compilers to schedule shader termination instructions earlier in the scheduling queue compared to other approaches. For instance, the ensuing reduction in the number of instructions executed by a shader before termination may allow aspects presented herein to yield significant performance benefits. Additionally, aspects of the present disclosure may allow for a reduction in the amount of instructions executed. Additionally, aspects presented herein may allow for a footprint reduction in the general purpose register (GPR), an improvement in wave size, a lower latency of memory accesses, and/or a power savings.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a termination component 198 configured to detect an existence of a shader termination construct for at least one graphics shader. The termination component 198 may also be configured to perform a first static analysis for an identification of a set of suitable candidates for a control flow delinearization associated with the shader termination construct. The termination component 198 may also be configured to perform a second static analysis for a cost modeling procedure for the set of suitable candidates for the control flow delinearization. The termination component 198 may also be configured to select, based on the cost modeling procedure, a candidate of the set of suitable candidates for the control flow delinearization. The termination component 198 may also be configured to perform an iterative fission process or a delinearization on the selected candidate of the set of suitable candidates for the control flow delinearization. The termination component 198 may also be configured to provide an indication of the selected candidate of the set of suitable candidates for the control flow delinearization. The termination component 198 may also be configured to reselect, based on the selected candidate, a second candidate of the set of suitable candidates for the control flow delinearization based on the cost modeling procedure. The termination component 198 may also be configured to provide an indication of the reselected second candidate of the set of suitable candidates of the control flow delinearization. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
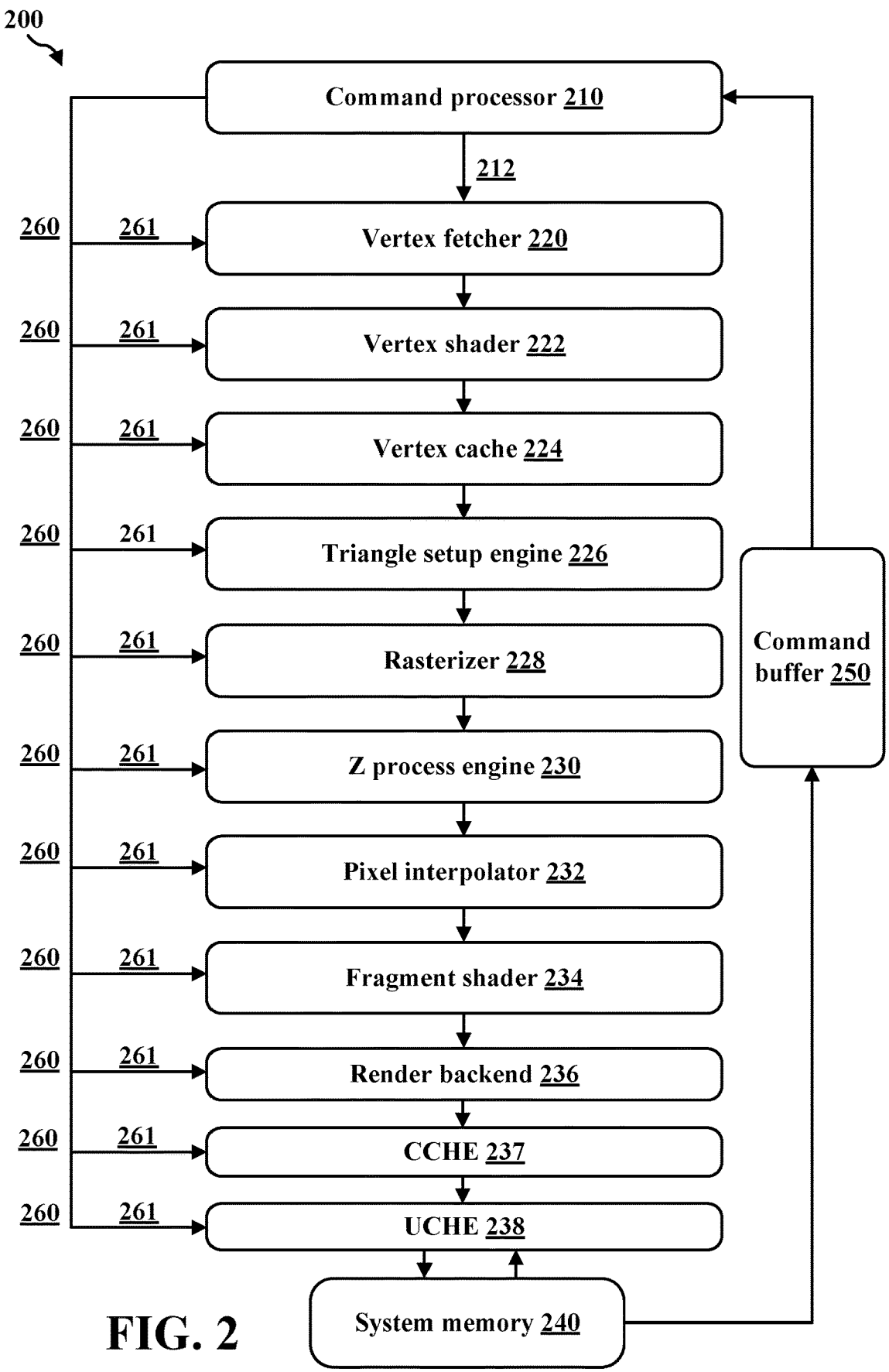
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 1 (L1) cache (cluster cache (CCHE)) 237, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212.

The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some types of GPUs may include different types of pipelines, such as a graphics processing pipeline. Graphics processing pipelines may include one or more of a vertex shader stage, a hull shader stage, a domain shader stage, a geometry shader stage, and a pixel shader stage. These stages of the graphics processing pipeline may be considered shader stages. These shader stages may be implemented as one or more shader programs that execute on shader units at a GPU. Shader units may be configured as a programmable pipeline of processing components. In some examples, a shader unit may be referred to as "shader processors" or "unified shaders," and may perform geometry, vertex, pixel, or other shading operations to render graphics. Shader units may include shader processors, each of which may include one or more components for fetching and decoding operations, one or more arithmetic logic units (ALUs) for carrying out arithmetic calculations, one or more memories, caches, and registers.

Figure 3:
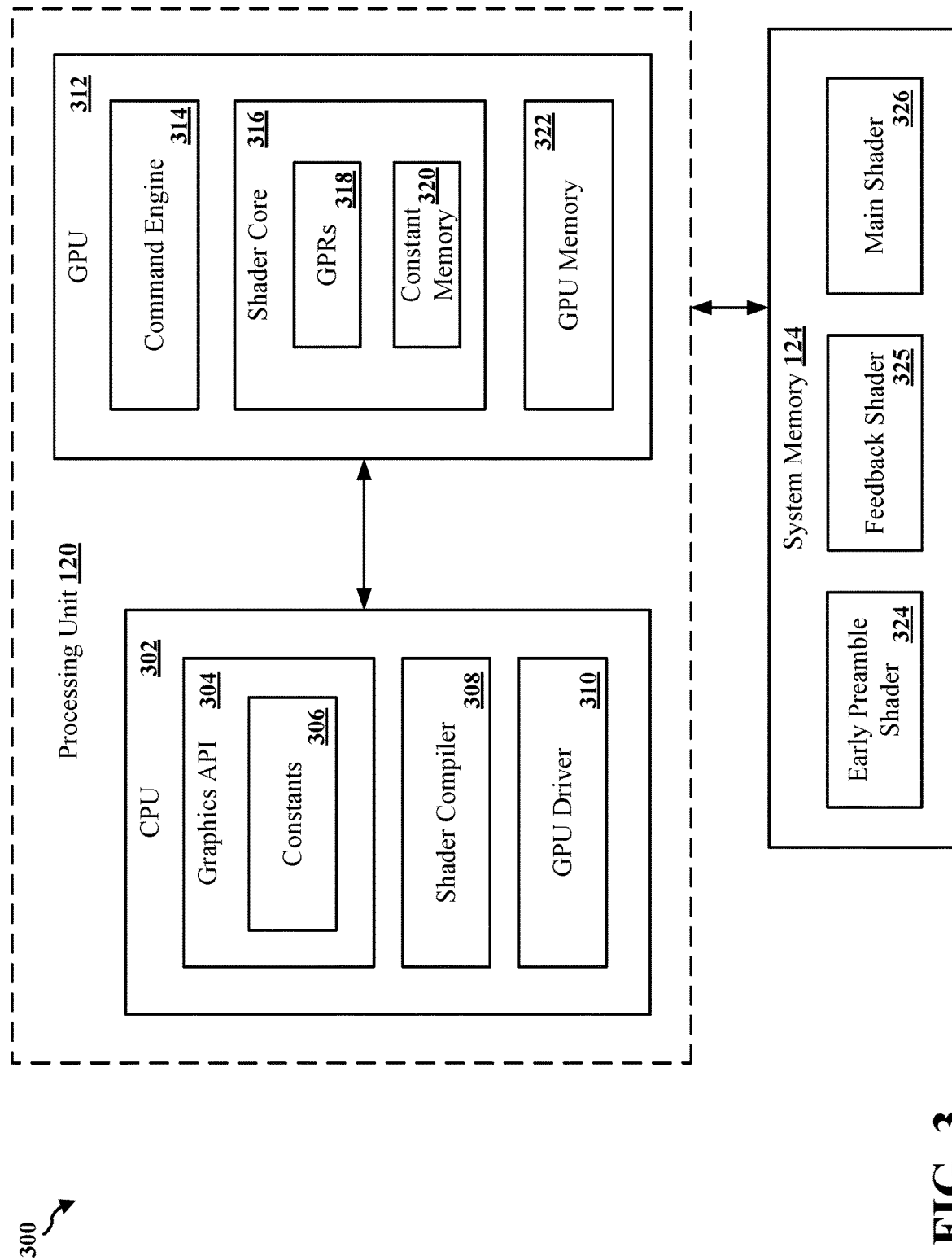
FIG. 3 is a diagram illustrating example processing components.

FIG. 3 is a diagram 300 that illustrates processing components, such as the processing unit 120 and the system memory 124, as may be identified in connection with the device 104 for processing data. In aspects, the processing unit 120 may include a CPU 302 and a GPU 312. The GPU 312 and the CPU 302 may be formed as an integrated circuit (e.g., a system-on-a-chip (SOC)) and/or the GPU 312 may be incorporated onto a motherboard with the CPU 302. Alternatively, the CPU 302 and the GPU 312 may be configured as distinct processing units that are communicatively coupled to each other. For example, the GPU 312 may be incorporated on a graphics card that is installed in a port of the motherboard that includes the CPU 302.

The CPU 302 may be configured to execute a software application that causes graphical content to be displayed (e.g., on the display(s) 131 of the device 104) based on one or more operations of the GPU 312. The software application may issue instructions to a graphics application program interface (API) 304, which may be a runtime program that translates instructions received from the software application into a format that is readable by a GPU driver 310. After receiving instructions from the software application via the graphics API 304, the GPU driver 310 may control an operation of the GPU 312 based on the instructions. For example, the GPU driver 310 may generate one or more command streams that are placed into the system memory 124, where the GPU 312 is instructed to execute the command streams (e.g., via one or more system calls). A command engine 314 included in the GPU 312 is configured to retrieve the one or more commands stored in the command streams. The command engine 314 may provide commands from the command stream for execution by the GPU 312. The command engine 314 may be hardware of the GPU 312, software/firmware executing on the GPU 312, or a combination thereof. While the GPU driver 310 is configured to implement the graphics API 304, the GPU driver 310 is not limited to being configured in accordance with any particular API. The system memory 124 may store the code for the GPU driver 310, which the CPU 302 may retrieve for execution. In examples, the GPU driver 310 may be configured to allow communication between the CPU 302 and the GPU 312, such as when the CPU 302 offloads graphics or non-graphics processing tasks to the GPU 312 via the GPU driver 310.

The system memory 124 may further store source code for one or more of an early preamble shader 324, a feedback shader 325, or a main shader 326. In such configurations, a shader compiler 308 executing on the CPU 302 may compile the source code of the shaders 324-326 to create object code or intermediate code executable by a shader core 316 of the GPU 312 during runtime (e.g., at the time when the shaders 324-326 are to be executed on the shader core 316). In some examples, the shader compiler 308 may pre-compile the shaders 324-326 and store the object code or intermediate code of the shader programs in the system memory 124. The shader compiler 308 (or in another example the GPU driver 310) executing on the CPU 302 may build a shader program with multiple components including the early preamble shader 324, the feedback shader 325, and the main shader 326. The main shader 326 may correspond to a portion or the entirety of the shader program that does not include the early preamble shader 324 or the feedback shader 325. The shader compiler 308 may receive instructions to compile the shader(s) 324-326 from a program executing on the CPU 302. The shader compiler 308 may also identify constant load instructions and common operations in the shader program for including the common operations within the early preamble shader 324 (rather than the main shader 326). The shader compiler 308 may identify such common instructions, for example, based on (presently undetermined) constants 306 to be included in the common instructions. The constants 306 may be defined within the graphics API 304 to be constant across an entire draw call. The shader compiler 308 may utilize instructions such as a preamble shader start to indicate a beginning of the early preamble shader 324 and a preamble shader end to indicate an end of the early preamble shader 324. Similar instructions may be used for the feedback shader 325 and the main shader 326. The feedback shader 325 will be described in further detail below.

The shader core 316 included in the GPU 312 may include general purpose registers (GPRs) 318 and constant memory 320. The GPRs 318 may correspond to a single GPR, a GPR file, and/or a GPR bank. Each GPR in the GPRs 318 may store data accessible to a single thread. The software and/or firmware executing on GPU 312 may be a shader program 324-326, which may execute on the shader core 316 of GPU 312. The shader core 316 may be configured to execute many instances of the same instructions of the same shader program in parallel. For example, the shader core 316 may execute the main shader 326 for each pixel that defines a given shape. The shader core 316 may transmit and receive data from applications executing on the CPU 302. In examples, constants 306 used for execution of the shaders 324-326 may be stored in a constant memory 320 (e.g., a read/write constant RAM) or the GPRs 318. The shader core 316 may load the constants 306 into the constant memory 320. In further examples, execution of the early preamble shader 324 or the feedback shader 325 may cause a constant value or a set of constant values to be stored in on-chip memory such as the constant memory 320 (e.g., constant RAM), the GPU memory 322, or the system memory 124. The constant memory 320 may include memory accessible by all aspects of the shader core 316 rather than just a particular portion reserved for a particular thread such as values held in the GPRs 318.

Figure 4:
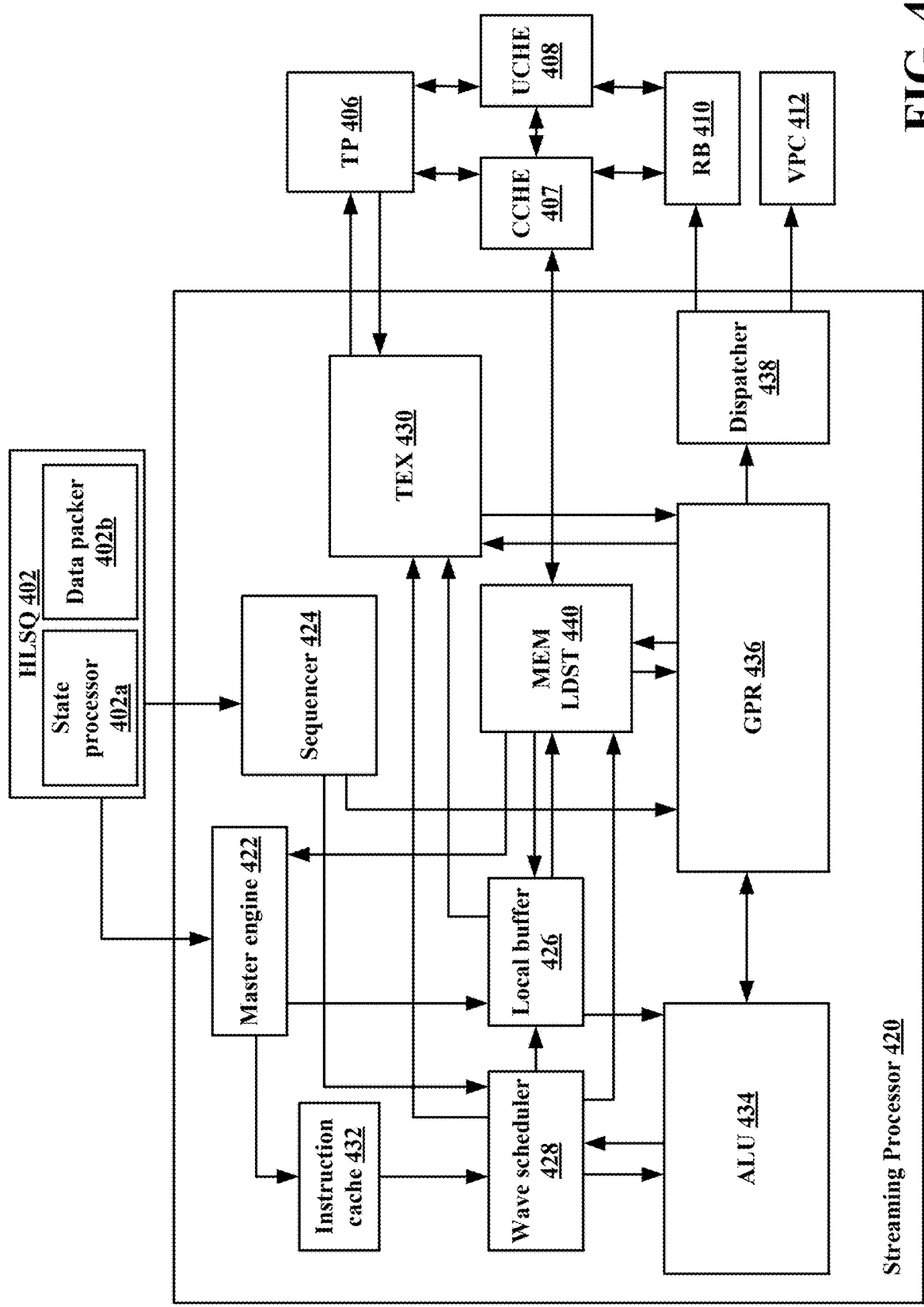
FIG. 4 is a diagram illustrating an example GPU.

FIG. 4 illustrates an example GPU 400. Specifically, FIG. 4 illustrates a streaming processor (SP) system in GPU 400. As shown in FIG. 4, GPU 400 includes a high level sequencer (HLSQ) 402, texture processor (TP) 406, level 1 (L1) cache (cluster cache (CCHE)) 407, level 2 (L2) cache (UCHE) 408, render backend (RB) 410, and vertex cache (VPC) 412. GPU 400 also includes SP 420, master engine 422, sequencer 424, local buffer 426, wave scheduler 428, texture (TEX) 430, instruction cache 432, arithmetic logic unit (ALU) 434, GPR 436, dispatcher 438, and memory (MEM) load store (LDST) 440.

As shown in FIG. 4, each unit or block in GPU 400 may send data or information to other blocks. For instance, HLSQ 402 may send commands to the master engine 422. Also, HLSQ 402 may send vertex threads, vertex attributes, pixel threads, pixel attributes, and/or compute commands to the sequencer 424. TP 406 may receive texture requests from TEX 430, and send texture elements (texels) back to the TEX 430. Further, TP 406 may send memory read requests to and receive memory data from CCHE 407 or UCHE 408. CCHE 407 or UCHE 408 may also receive memory read or write requests from MEM LDST 440 and send memory data back to MEM LDST 440, as well as receive memory read or write requests from RB 410 and send memory data back to RB 410. Also, RB 410 may receive an output in the form of color from GPR 436, e.g., via dispatcher 438. VPC 412 may also receive output in the form of vertices from GPR 436, e.g., via dispatcher 438. GPR 436 may send address data or receive write back data from MEM LDST 440. GPR 436 may also send temporary data to and receive temporary data from ALU 434. Moreover, ALU 434 may send address or predicate information to the wave scheduler 428, as well as receive instructions from wave scheduler 428. Local buffer 426 may send constant data to ALU 434. TEX 430 may also receive texture attributes from or send texture data to GPR 436, as well as receive constant data from local buffer 426. Further, TEX 430 may receive texture requests from wave scheduler 428, as well as receive constant data from local buffer 426. MEM LDST 440 may send/receive constant data to/from local buffer 426. Sequencer 424 may send wave data to wave scheduler 428, as well as send data to GPR 436. The sequencer 424 may allocate resources and local memory. Also, the sequencer 424 may allocate wave slots and any associated GPR 436 space. For example, the sequencer 424 may allocate wave slots or GPR 436 space when the HLSQ 402 issues a pixel tile workload to the SP 420. Master engine 422 may send program data to instruction cache 432, as well as send constant data to local buffer 426 and receive instructions from MEM LDST 440. Instruction cache 432 may send instructions or decode information to wave scheduler 428. Wave scheduler 428 may send read requests to local buffer 426, as well as send memory requests to MEM LDST 440.

As further shown in FIG. 4, the HLSQ 402 may prepare one or more context states for the SP 420. For example, the HLSQ 402 may prepare the context states for different types of data, e.g., global register data, shader constant data, buffer descriptors, instructions, etc. Additionally, the HLSQ 402 may embed context states into a command stream to the SP 420. The master engine 422 may parse the command stream from the HLSQ 402 and setup an SP global state. Moreover, the master engine 422 may fill or add to an instruction cache 432 and/or a local buffer 426 or a constant buffer. In some aspects, inside the HLSQ 402, there may be an internal function unit called a state processor 402*a*. The state processor 402*a* may be a single fiber scalar processor that may execute a special shader program, e.g., a preamble shader. The preamble shader may be generated by the GPU compiler in order to load constant data from different buffer objects. Also, the preamble shader may bind the buffer objects into a single constant buffer, such as a post-process constant buffer. Further, the HLSQ 402 may execute the preamble shader and, as a result, skip utilizing a main shader. In some instances, the main shader may perform different shading tasks, such as normal vertex shading and/or a fragment shading program. Moreover, the HLSQ 402 may include a data packer 402*b*.

Additionally, as shown in FIG. 4, the SP 420 may not be limited to executing a preamble if the HLSQ 402 decides to skip a preamble execution. For instance, the SP 420 may also process a conventional graphics workload, such as vertex shading and/or fragment shading. In some aspects, the SP 420 may utilize its execution units and storage in order to process compute tasks as a general purpose GPU (GPGPU). Inside the SP 420, there may be multiple parallel instruction execution units such as an ALU, elementary function unit (EFU), branching unit, TEX, general memory read and write (aka LDST), etc. The SP 420 may also include on-chip storage memory, such as a GPR 436 which may store per-fiber private data. Also, the SP 420 may include a local buffer 426 which stores per-shader or per-kernel constant data, per-wave uniform data (aka uGPR), and per-compute work group (WG) local memory (LM).

Processing a preamble shader may take up one wave slot. Further, the majority of preamble shaders may use just the uGPR and not the GPR, and may execute ALU instructions on a scalar ALU. Therefore, execution of the preamble shader may be associated with high performance, and may be power efficient because any available wave slot may be used to execute the preamble shader even without GPR space allocation.

Moreover, as shown in FIG. 4, dispatcher 438 may fetch data from GPR 436. Dispatcher 438 may also perform format conversion, and then dispatch a final color to multiple render targets (RTs). Each RT may have one or more components, such as red (r) green (G) blue (B) alpha (A) (RGBA) data, or just an alpha component of the RGBA data. Further, each RT may be generally stored in a vector GPR, i.e., R3.0 may store red data, R3.1 may store green data, R3.2 may store blue data, etc. Also, a driver program in an SP context register may be utilized to define the GPR identifier (ID) which stores RT data.

Figure 5:
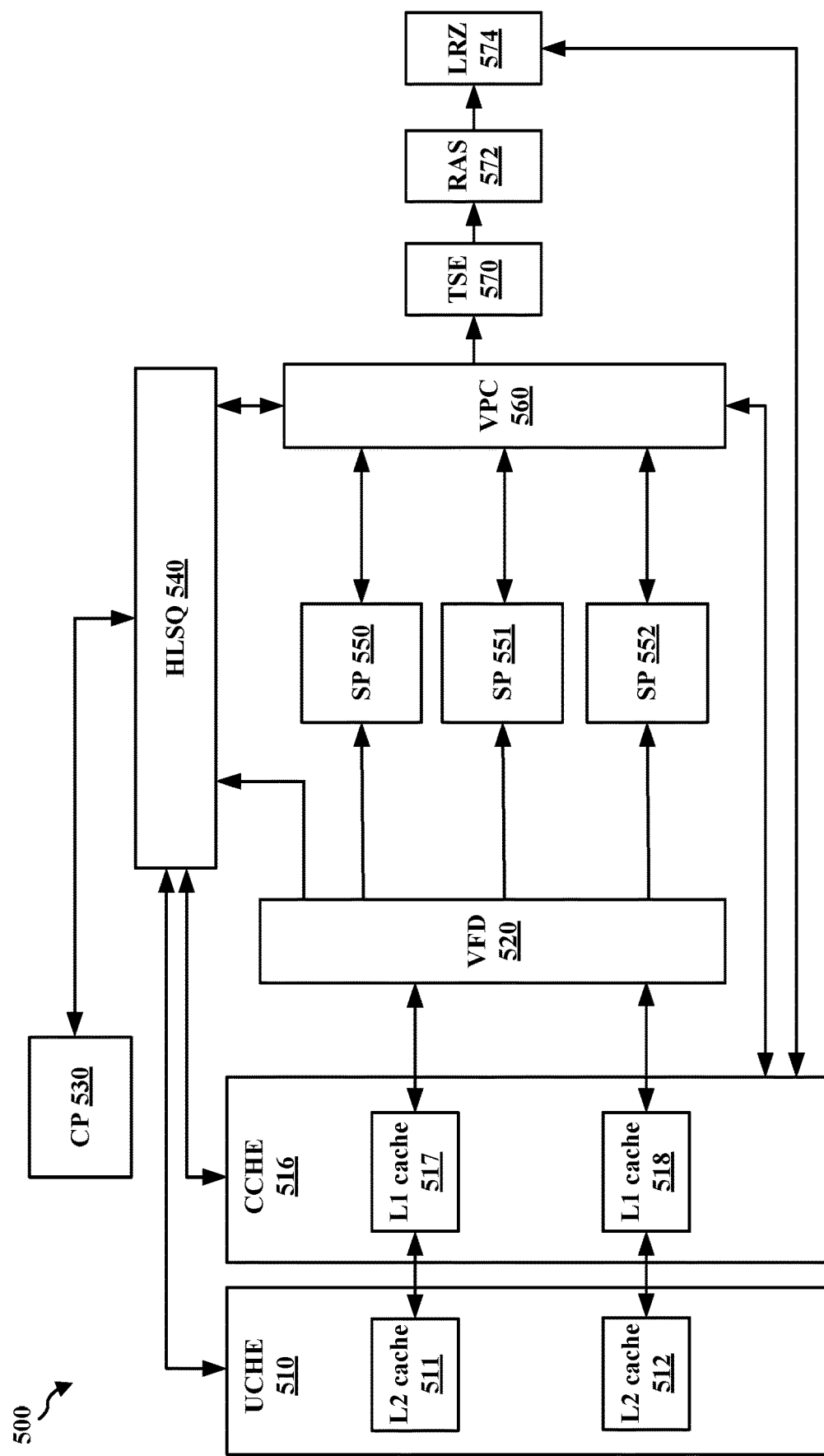
FIG. 5 is a diagram illustrating an example GPU.

FIG. 5 is a diagram illustrating another example GPU. More specifically, FIG. 5 depicts GPU 500 including a number of different components. As shown in FIG. 5, GPU 500 includes UCHE 510 including L2 cache 511 and L2 cache 512, CCHE 516 including L1 cache 517 and L1 cache 518, VFD 520, CP 530, HLSQ 540, a number of SPs (e.g., SP 550, SP 551, and SP 552), VPC 560, TSE 570, RAS 572, and low resolution Z (LRZ) component (e.g., LRZ 574). As shown in FIG. 5, CP 530 may transmit data to HLSQ 540 and receive data from HLSQ 540. CCHE 516 may transmit/receive data to/from HLSQ 540. UCHE 510 may also transmit/receive data to/from HLSQ 540. L2 cache 511 and L2 cache 512 may transmit/receive data to/from VFD 520. Further, VFD 520 may transmit data to HLSQ 540, as well as transmit data to SPs 550-552. Moreover, SPs 550-552 may transmit/receive data to/from VPC 560. Also, VPC 560 may transmit/receive data to/from HLSQ 540. Data can also be transmitted from VPC 560 to TSE 570, which can transmit data to RAS 572, and then to LRZ 574. CCHE 516 can transmit/receive data to/from VPC 560 and LRZ 574. Also, UCHE 510 can transmit/receive data to/from VPC 560 and LRZ 574.

In some aspects of computer graphics, a shader may be a computer program that calculates or computes a level of light for a scene. For example, a shader may calculate an appropriate level of light, darkness, and/or color during the rendering of a scene (e.g., 3D scene), which is part of a process known as shading). Additionally, shaders may perform a variety of functions for special effects in computer graphics and/or video post-processing. Shaders may also be utilized for general purpose computing within graphics processing. In some instances, shaders may calculate rendering effects on graphics hardware with a degree of flexibility. Many types of shaders may be coded for (i.e., run on) specific components for graphics processing (e.g., a graphics processing unit (GPU)). In some aspects, shading languages may be used to program within a GPU's rendering pipeline. Shaders may also allow for customized effects for be utilized at GPUs. For example, certain attributes such as position/color (e.g., hue, saturation, brightness, and contrast) of pixels, vertices, and/or textures used to generate a final rendered image may be altered with the use of a shader (e.g., using algorithms defined in a shader. Further, certain attributes may be modified by external variables or textures introduced by a computer program calling the shader.

Additionally, shaders may be a type of computer program that describes the traits of a vertex (e.g., with a vertex shader) and/or a pixel (e.g., with a pixel shader) in a scene in graphics processing. For instance, vertex shaders may describe certain attributes of a vertex (e.g., position, texture coordinates, colors, etc.), and pixel shaders describe certain traits of a pixel (e.g., color, z-depth, alpha value, etc.). In some instances, a vertex shader may be called for each vertex in a primitive (e.g., called after tessellation). For instance, each vertex may then be rendered as a series of pixels onto a surface (e.g., a block of memory) that may be sent to the screen for display. Moreover, shaders may provide a programmable alternative to hard-coded approaches within graphics processing.

In some aspects, a shader may specify programmable operations that execute for each attribute (e.g., vertex, control point, tessellated vertex, primitive, fragment, or workgroup) in a corresponding stage of a graphics pipeline. Graphics pipelines may include vertex shaders, geometry shaders, and/or fragment shaders. A compute shader stage may be included in a compute pipeline, where compute shaders may operate on compute invocations in a workgroup. Shaders may read from input variables, as well as read from and write to output variables. Input and output variables may be used to transfer data between shader stages, or to allow the shader to interact with values that exist in the execution environment. Similarly, the execution environment may provide constants that describe capabilities. Shader variables may also be associated with execution environment-provided inputs and outputs using built-in decorations in the shader.

Shaders may also be terminated after they are called or invoked via a command/instruction. In some instances, a shader invocation that is terminated may have finished executing instructions from the command/instruction. In other instances, a shader invocation that is terminated may not have finished executing instructions from the command/instruction, which may refer to early termination of the shader. Implementations may also terminate a shader invocation when a kill/terminate operation is executed in any function. In addition, a shader stage for a given command may complete execution when all invocations for that stage have terminated.

Some types of graphics applications may utilize early termination of graphics shaders. In certain graphics applications (e.g., multiple-pass (multi-pass) graphics applications), early termination may be an invaluable ability to preclude redundant work. For example, some type of graphics constructs (e.g., open graphics library (OpenGL) discard construct) may enable early termination of shaders. The discard construct in a fragment shader may cause the control flow to exit the shader and/or preclude any updates to the buffers. Scheduling such termination constructs as early as possible in the instruction queue may help avoid the overhead of unnecessary work within the graphics pipeline. For instance, in OpenGL, there may be a series of different stages of program transformation and, at any point in the program, there may be an opportunity to early terminate the program and not perform any of the work. The rest of the pipeline may benefit from this early termination by avoiding a number of functions (e.g., buffer updates, memory accesses, updating pixels on the screen, updating colors, etc.). Indeed, early termination may save time, computation, power consumption, and any associated benefits. Accordingly, graphics languages such as OpenGL may provide a specific construct for early termination options. Further, graphics languages may offer constructs to terminate shader from arbitrary points, rather than just end of a program.

Figure 6:
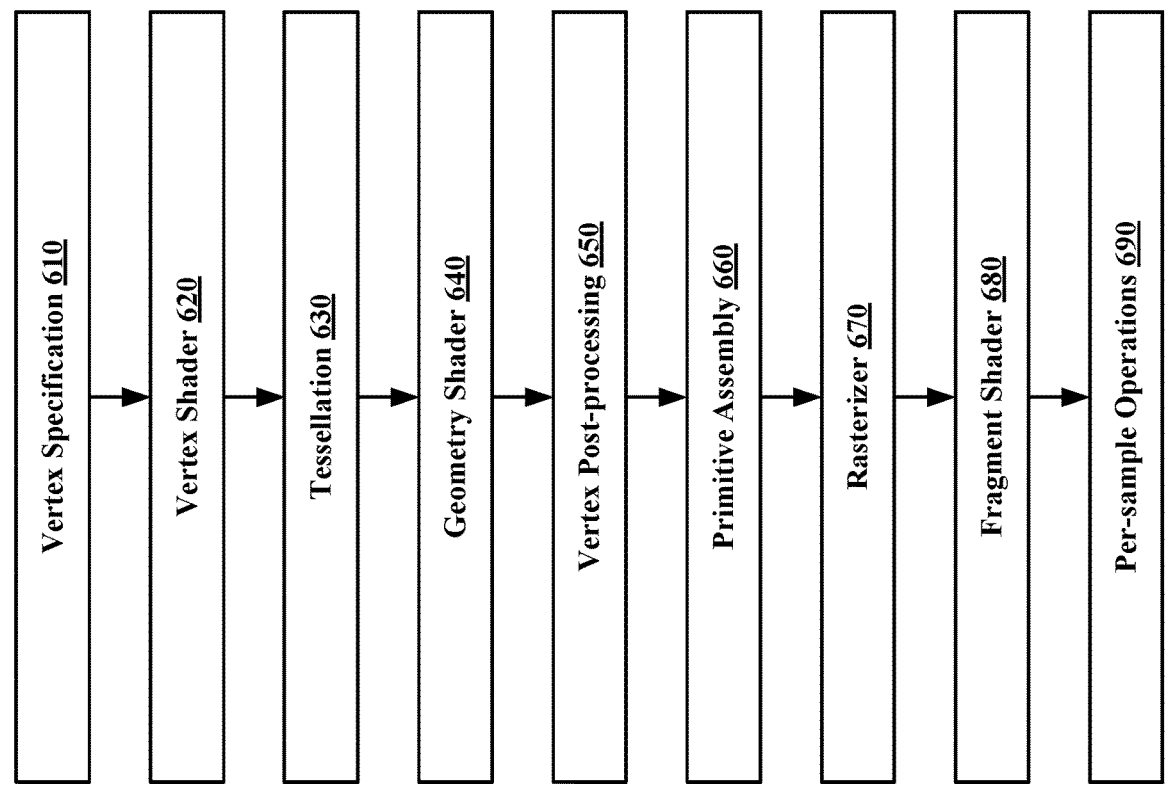
FIG. 6 is a diagram illustrating an example graphics pipeline.

FIG. 6 is a diagram 600 illustrating an example graphics pipeline. More specifically, FIG. 6 depicts an example graphics pipeline that may execute shading instructions. As shown in FIG. 6, diagram 600 includes vertex specification component 610, vertex shader 620, tessellation component 630, geometry shader 640, vertex post-processing component 650, primitive assembly component 660, rasterizer 670, fragment shader 680, and per-sample operations component 690. FIG. 6 depicts components in a graphics pipeline that may run graphics constructs for early termination of graphics instructions (e.g., shader instructions). The components in FIG. 6 may utilize early termination of graphics instructions (e.g., shader instructions) with redundant or unnecessary computations. FIG. 7 is a diagram 700 illustrating example code for graphics operations. For example, the code in FIG. 7 may allow for redundant computations of early termination of graphics instructions (e.g., shader instructions).

In some aspects, divergence in a graphics control-flow (e.g., divergence introduced by certain branches or branch instructions) may inhibit certain types of efficient graphics instructions (e.g., instruction-level parallelism). As such, compilers may employ certain conversion techniques (e.g., if-conversion) to transform an acyclic control flow graph into an enlarged basic block of predicated instructions. However, while if-conversion may expose instruction-level parallelism within graphics processing, speculative and predicated execution from if-conversion may incur the processor overhead of fetching and executing instructions even if their results remain unused. In graphics applications with multiple-pass (multi-pass) shaders, the overhead of speculative and predicated execution may be large. This may be especially true in the presence of early-termination constructs (e.g., a discard construct) in divergent paths of the graphics control flow.

In some aspects, compiling a graphics application for early termination of shaders to avoid redundant work, as well as exploiting instruction-level parallelism, may present a dilemma. For instance, if-conversion may be most effective upon exposing maximal instructions in a block to facilitate parallelism. Moreover, a compiler's scheduling of discard may be most performant upon precluding maximal instructions from execution (i.e., the instructions that would eventually become redundant upon shader termination). These competing optimization goals may necessitate a delicate balance that is tightly coupled with processor architecture and the characteristics of conditional branches in the shader code. Based on the above, it may be beneficial to terminate shader instructions before any redundant computations. It may also be beneficial to allow compilers to schedule shader termination instructions early in a scheduling queue for graphics instructions.

Aspects of the present disclosure may allow shader instructions to be terminated (i.e., terminated early) before any redundant computations. Aspects presented herein may do so by allowing compilers to schedule shader termination instructions early in a scheduling queue for graphics instructions. For example, aspects presented herein may contribute techniques for enabling compilers to schedule shader termination instructions earlier in the scheduling queue compared to other approaches. For instance, the ensuing reduction in the number of instructions executed by a shader before termination may allow aspects presented herein to yield significant performance benefits. Aspects presented herein may also provide a cost-model driven fission of if-conditionals as an effective and practical mechanism to enable scheduling of shader termination constructs early in the instruction queue. By doing so, aspects presented herein may reduce the amount of redundant work associated with shader instructions. Aspects presented herein may result in performance evaluations that indicate a significant reduction in work when terminating shader instructions early. For example, aspects presented herein may provide a reduction in dynamic execution count of certain instructions in graphics shaders (e.g., arithmetic logic unit (ALU) instructions and texture instructions).

Aspects presented herein propose techniques for enabling compilers to schedule shader termination instructions much earlier in the scheduling queue as compared to current approaches. The reduction in the true number of instructions executed by shader before termination may yield significant performance benefits. Aspects presented herein describe a technique for selective code transformation on branch-related control structures to facilitate scheduling of shader-termination constructs early in the scheduling queue while also allowing for maximal instruction-level parallelism. A cost model incorporating target specific micro-architectural details, and the characteristics of conditional branches, may drive selective transformations. The cost model may aim to maximize the potential for early termination while minimizing the cost of predication on blocks. Also, code transformation underpinning the aspects presented herein may be fission of test conditionals in branches to introduce control flows in a control flow graph (CFG).

Additionally, in some instances, given an intermediate representation of a graphics program, aspects presented herein may utilize technique for selective code transformation on branch-related control structures to facilitate scheduling of shader termination constructs early in the scheduling queue. Aspects presented herein may also allowing for maximal instruction level parallelism. Additionally, aspects presented herein may utilize a cost model incorporating target specific micro-architectural details, and the characteristics of conditional branches of these instructions may help to drive selective transformations. Further, the cost model utilized herein may maximize the potential for early termination while minimizing the cost of predication on blocks. Aspects presented herein may also utilize code transformation including a fission of test-conditionals in branches to introduce control flows in a CFG. Moreover, the introduction of control structures in the CFG may be syntactic and may not manipulate program semantics.

As described herein, a branch instruction may represent a conditional branch of a program and its nesting in disparate forms: if-then, if-then-else, and if-then-elseif in a program. An "if-conditional" may refer to a simple or compound proposition that controls the flow of execution along one or more paths emanating from the branch instruction. An expression may be in canonical form if it is one of the following: (a) a Boolean literal, (b) a call to a pure function that evaluates to a Boolean literal, (c) a logical conjunction or disjunction of (a) and/or (b), or (d) a compare expression using one of these operators: '==', '!=', '<', '>', '<=', '>=', where both the left hand side and the right hand side of the expression are integer or floating point scalar literals.

FIG. 8 is a diagram 800 and diagram 810, respectively, illustrating example code for graphics operations. More specifically, FIG. 8 depicts code forms before and after fission of if-conditionals. As shown in FIG. 8, diagram 800 shows example code before a fission of if-conditionals, and diagram 810 shows example code after the fission of if-conditionals. FIG. 8 depicts a simple example of fission of if-conditionals in diagram 800 and diagram 810. In diagram 800, the listing on the left hand side of FIG. 8 contains a block of code (lines 10-13) controlled by the compound proposition condition 1 (cond1)||condition 2 (cond2) in the if-conditional in line 9. Both cond1 and cond2 may be simple propositions that evaluate to Booleans. As shown in diagram 810, the fission of if-conditional in line 9 yields the code structure shown in the listing on the right hand side of FIG. 8, which may enable the program to terminate early and avoid evaluation of func2( . . . ) if cond1( . . . ) evaluates to true.

As depicted in FIG. 8, the fission of if-conditionals may not always be legal or profitable. In the example in FIG. 8, the if-conditionals may be in canonical form and the body of the if-statement may also be side-effect free. Similarly, the resulting benefit of the if-conditionals may overcome the overhead of a number of different factors, such as code bloat, lost opportunity for predication, and code motion. As described below, aspects herein may utilize a different approach to fission, which may be accompanied by safety and profitability criteria.

Aspects presented herein may utilize a novel manner for the fission of if-conditionals. For instance, aspects presented herein may find eligible if-conditionals. In some aspects, an if-conditional in a branch instruction may be an eligible candidate for potential fission if: (i) the if-conditional is in canonical form, (ii) the if-conditional is uniform over all fibers in the wavefront, (iii) the immediate successors of the branch instruction are free of side effects, (iv) the immediate successors of the branch instruction are wave uniform, and (v) one or more of the paths emanating from the if-construct contains a shader termination construct, such as pixel kill/discard. Additionally, for each eligible if-construct, aspects presented herein may repeat the following steps until fixed-form convergence or as guarded by a cost model. For example, aspects presented herein may create disjunction of if-conditionals, such as by employing arithmetic simplifications and theory of Boolean logic to create disjunction of if-conditionals. Table 1 below shows a non-exhaustive list of laws enabling simplifications, which may be applied iteratively until fixed form is reached or as limited by a cost model.

TABLE 1

Laws of Boolean Logic Equivalence and Arithmetic Simplification

| Law | Base Form | Equivalent Form |
|---|---|---|
| DeMorgan's | $\neg(A \land B)$ | $(\neg A) \lor (\neg B)$ |
| Distributivity | $A \land (B \lor C)$ | $(A \land B) \lor (A \land C)$ |
| Distributivity | $(A \lor B) \land (A \lor C)$ | $A \lor (B \land C)$ |
| Multiplicative | $((A * B * C) == 0)$ | $(A == 0) \lor (B == 0) \lor (C == 0)$ |

Aspects presented herein may also skip fission if it is not deemed profitable. For example, if the profitability analysis determines that the perceived benefits of fission cannot sufficiently outweigh the lost benefits of predication and the overheads of code motion and duplication, aspects presented herein may skip creating a fission of the current candidate. Aspects presented herein may also perform if-statement fission. For example, aspects presented herein create a separate control flow corresponding to each test-proposition in the disjunction of if-conditionals, and replicate the body of the original if-construct. Aspects presented herein may also remove the original if-construct along with its test conditionals and the associated body.

Additionally, aspects presented herein may perform a profitability analysis. For instance, while fission of if-conditionals can yield performance benefits by reducing the number of instructions executed, it can also prevent predication and associated benefits. As such, a profitability analysis may account for (i) cost of fission, (ii) benefits of fission, (iii) lost benefit from predication, and (iv) effective benefit from code motion enabled by fission. Aspects presented herein may delay the cost-driven selection of predication to a later stage in the compilation. Therefore, profitability analysis may not need to account for predication and control flow introduction. Aspects presented herein may also allow for an increase in code size (cost$_{codeSize}$) where the code size Additionally, the procedures within Algorithm 1 below show the key steps in fission of if-conditionals. For instance. Algorithm 1 below depicts a simplistic approach to approximating cost of fission of different kinds of if-conditionals:

```
Algorithm 1: Fission of if-conditionals
# 1. Main routine driving fission of eligible if-conditionals
# as determined by safety and profitability criteria.
Procedure-1: selectiveIfConditionalFission(P, Changed=True)
for Each F in P do
    for Each BI in S do
        if BBBI is WaveUniform then
            if BI's conditional is Canonical then
                if SuccBB are side-effect free then
                    while (Changed Λ isIfConditionalFissionProfitable(BI)) do
                        Changed | = createIfConditionalFission(BI)
# 2. Actual code transformation creating fission of if-conditionals.
Procedure-2: createIfConditionalFission(BI)
Create disjunctions of simple propositions from the compound proposition in if-
conditional of BI
for Each simple proposition in if-conditional of BI do
    Create newBI using the simple proposition
    Replicate SuccBI and set them as branch targets of newBI
    Remove BI and SuccBI
# 3. Static analysis deciding profitability of if-conditional fission.
Procedure-3: isIfConditionalFissionProfitable(BI)
totalCost = 0
for Each simple proposition (SimP) in BI do
    if Both LHS and RHS of SimP are literals then
        totalCost + = 0
    else if LHS or RHS is a literal and the other is derived from input then
        totalCost + = 1
    else if LHS or RHS of SimP is a literal and the other is derived from sample/load then
        totalCost + = 5
    else
        totalCost + = 10
``` may increase from duplication of body of if-construct. Aspects presented herein may also account for the cost of fission (cost$_{fission}$) where all if-conditionals may not incur the same cost of fission. The profitability analysis may categorize a relative cost of fission of if-conditionals based on operands of the associated simple propositions. Aspects presented herein may also account benefit of fission (benefit$_{fission}$) where fission may reduce the number of instructions scheduled before discard construct, and can be approximated as: benefit$_{fission}$=number of instructions*ExecutionProbability. Further, aspects presented herein may account for the benefit of code motion (benefit$_{codeMotion}$) where fission may also enable the scheduler to move code such that definitions are scheduled closer to their use. By doing so, this may reduce register footprint and potentially increasing wavesize. Further, state-of-the-art cost models attuned for specific targets may be used to compute the approximate costs of code size increase, and effective benefits from reduction in number of instructions executed and code motion. The cost model unique to aspects presented herein may be that of fission of if-conditionals. In some aspects, propositions in if-conditionals that involve memory or texture access may be deemed to incur higher cost compared to those with literal operands. Overall, fission of an if-conditional may be deemed profitable if: (benefit$_{fission}$+benefit$_{codeMotion}$)>α(cost$_{codeSize}$+cost$_{fission}$), where α is a target-specific scaling factor.

FIG. 9 is a diagram 900 illustrating example code for graphics operations. For example, the code shown in FIG. 9 may allow aspects presented herein to perform if-conditional fission.

Algorithm 1 above depicts the following notations: P: User Program, F: Function, BI: Branch Instruction, BBI: Basic Block containing instruction I, Succ$_{BB}$: immediate successors of basic block BB. WaveUniform: Basic Block executed in lockstep by all fibers in a wavefront. Further, the input to Algorithm 1 is a user Program P or its intermediate representation, and the output is a user Program P with select if-conditionals fissioned.

FIG. 10 is a diagram 1000 and diagram 1010, respectively, illustrating example code for graphics operations. More specifically, FIG. 10 depicts code depicting arithmetic simplification and fission of if-conditionals. As shown in FIG. 10, diagram 1000 shows example code depicting arithmetic simplification of if-conditionals, and diagram 1010 shows example code depicting fission of if-conditionals. As depicted in FIG. 10, the if-conditional of interest is: (outColor.x*outColor.y*outColor.z)==0). The body of its associated if-construct contains a call to discard. As indicated herein, aspects of the present disclosure may enable the program to schedule the discard construct as early as possible to avoid redundant work.

As shown in FIG. 10, algorithmic steps enabling if-conditional fission in this example include: (i) arithmetic simplification of the if-conditional using the multiplicative law: (outColor.x*outColor.y*outColor.z)==0)→((outColor.x==0)||(outColor.y==0)||(outColor.z==0)). Also, as shown in FIG. 10, aspects presented herein may perform: (ii) profitability check based on the perceived benefits of new if-constructs built atop each test proposition in the disjunctive form of the compound proposition above. Further, as shown in FIG. 10, aspects presented herein may perform: (iii) creation of a new if-construct for each simple proposition in the disjunction. This step also involves replicating the body of the original statement and updating branch target to the replicated block. For example, if (outColor.x*outColor.y*outColor.z)==0) S; →if (outColor.x*outColor.y*outColor.z)==0) S; if (outColor.x==0) S1; if (outColor.y==0) S2; if (outColor.z==0) S3, where S1, S2, and S3 are replicas of S. Further, as shown in FIG. 10, aspects presented herein may (iv) removal of original compound conditional and its body. For example, if (outColor.x*outColor.y*outColor.z)==0) S; if (outColor.x==0) S1; if (outColor.y==0) S2; if (outColor.z==0) S3; →if (outColor.x==0) S1; if (outColor.y==0) S2; if (outColor.z==0) S3.

FIG. 11 is a diagram 1100 and diagram 1110, respectively, illustrating example code for graphics operations. More specifically, FIG. 11 depicts code depicting arithmetic simplification and fission of if-conditionals. As shown in FIG. 11, diagram 1100 shows example code depicting arithmetic simplification of if-conditionals, and diagram 1110 shows example code depicting fission of if-conditionals. FIG. 11 depicts another example of fission of if-conditionals using Boolean logic theory in order to facilitate early termination of the user program.

FIG. 12 is a diagram 1200 and diagram 1210, respectively, illustrating example code for graphics operations. More specifically, FIG. 12 depicts code for before and after fission of if-conditionals. As shown in FIG. 12, diagram 1200 shows example code before a fission of if-conditionals, and diagram 1210 shows example code after the fission of if-conditionals. FIG. 12 depicts a simple example of fission of if-conditionals in diagram 1200 and diagram 1210.

FIG. 13 is a diagram 1300 and diagram 1310, respectively, illustrating example code for graphics operations. More specifically, FIG. 13 depicts code for before and after fission of if-conditionals. As shown in FIG. 13, diagram 1300 shows example code before a fission of if-conditionals, and diagram 1310 shows example code after the fission of if-conditionals. FIG. 13 depicts a simple example of fission of if-conditionals in diagram 1300 and diagram 1310. Also, FIG. 13 shows the corresponding disassembly of code generated for an application, which is both before (diagram 1300) and after (diagram 1310) the fission of if-conditionals. As shown in FIG. 13, the code in diagram 1310 may help to avoid redundant execution of ALU instructions. Further, the reduction in ALU execution count may yield an overall improvement in the total execution time (e.g., a 1.2% improvement in the total execution time).

Figure 14:
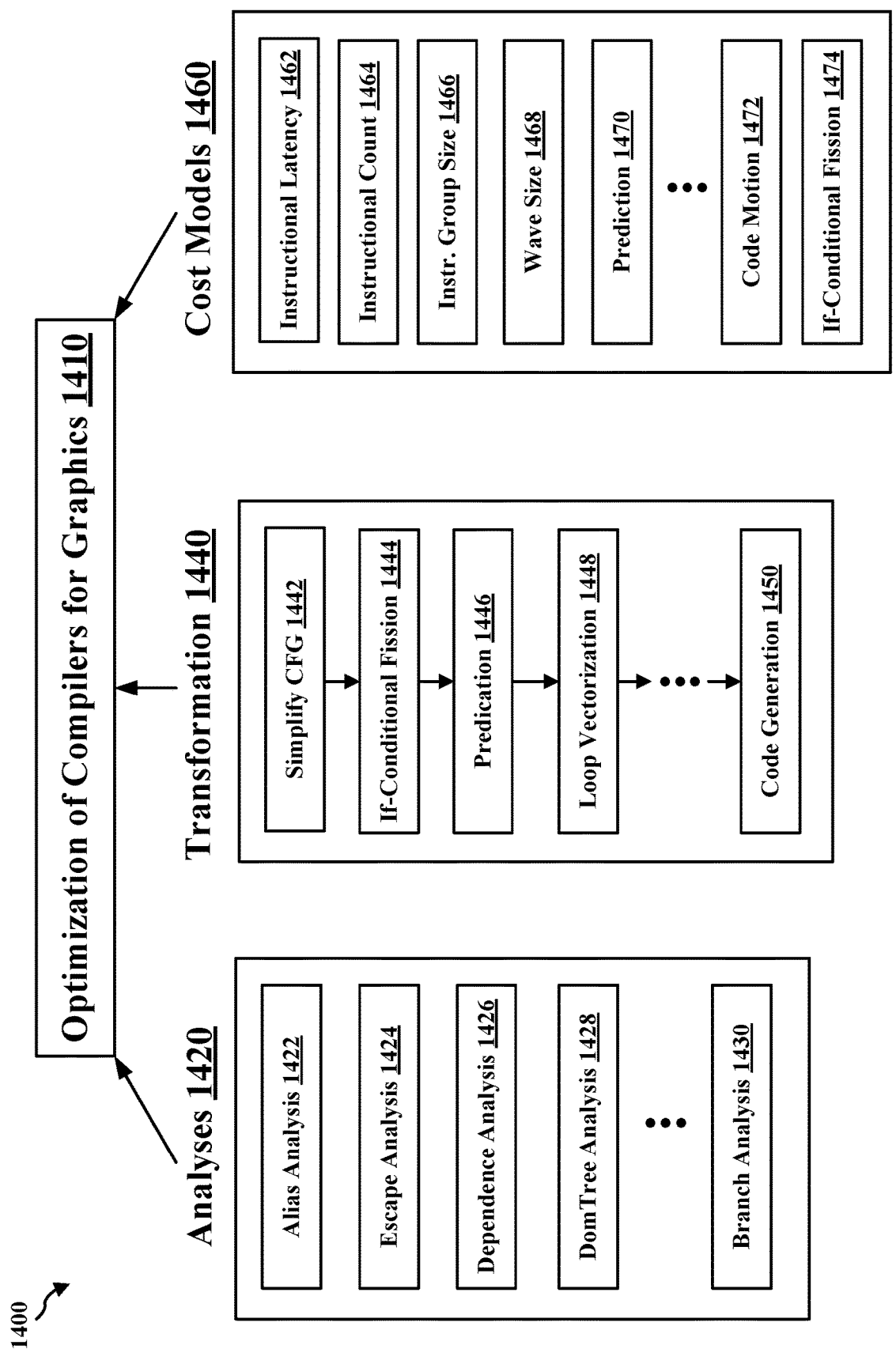
FIG. 14 is a diagram illustrating an example technique for compiler optimization.

FIG. 14 is a diagram 1400 illustrating an example technique for compiler optimization. More specifically, FIG. 14 depicts an example technique to optimize compiler execution. As shown in FIG. 14, diagram 1400 includes technique 1410 to optimize compiler execution for graphics processing including analyses 1420, transformation 1440, and cost models 1460. FIG. 14 depicts that analyses 1420 includes alias analysis 1422, escape analysis 1424, dependence analysis 1426, DomTree analysis 1428, and branch analysis 1430. Also, transformation 1440 includes simplify CFG 1442, if-conditional fission 1444, predication 1446, loop vectorization 1448, and code generation 1450. Further, cost models 1460 includes instructional latency model 1462, instructional count model 1464, instructional group size model 1466, wave size model 1468, prediction model 1470, code motion model 1472, and if-conditional fission model 1474.

In some aspects, as shown in FIG. 14, aspects presented herein may detect an existence of a shader termination construct for at least one graphics shader (e.g., via prediction model 1470). A shader termination construct may refer to the end of an execution of a graphics shader program. Also, aspects presented herein may perform a first static analysis for an identification of a set of suitable candidates for a control flow delinearization associated with the shader termination construct (e.g., via analyses 1420). A static analysis may refer to the art of deriving facts from source code without executing it. A control flow delinearization may refer to a program transformation that splits a branch instruction into multiple branch instructions with each branch instruction employing a part of the original branch instruction's conditional. In some aspects, introduction of additional control structures in the program may lead to a more delinearized control flow graph (CFG). Further, aspects presented herein may perform a second static analysis for a cost modeling procedure for the set of suitable candidates for the control flow delinearization (e.g., via cost models 1460). A cost modeling may refer to employing analytical models to estimate the overall costs and benefits of executing specific sections of code, such as branches, on a chosen hardware target. Aspects presented herein may also select, based on the cost modeling procedure, a candidate of the set of suitable candidates for the control flow delinearization (e.g., via branch analysis 1430). Moreover, aspects presented herein may provide an indication of the selected candidate of the set of suitable candidates for the control flow delinearization (e.g., via cost models 1460). Also, aspects presented herein may performing an iterative fission process or a delinearization on the selected candidate of the set of suitable candidates for the control flow delinearization (e.g., via if-conditional fission model 1474). Iterative fission may refer to performing fission recursively until the conditionals are elementary and can no longer be split or the cost model prohibits any further fission. In computer programming, control flow may refer to the order of execution or evaluation of instructions, statements, or function calls. Delinearization (e.g., in the context of control flow in programs) may refer to the introduction of branches whose conditionals determine the execution of one or multiple possible paths of execution.

Additionally, as shown in FIG. 14, aspects presented herein may provide a code-transformation technique for if-conditional fission (e.g., via if-conditional fission model 1474). Aspects presented herein may also provide a static analysis for determining pre-requisites to functionally correct if-conditional fission (e.g., via prediction model 1470). Moreover, aspects presented herein may provide a cost model to encode profitability of if-conditional fission (e.g., via cost models 1460). Also, aspects presented herein may provide a technique to generate profitability scores for if-conditional fission (e.g., via cost models 1460). Further, aspects presented herein may provide a use of the cost model for selection of profitable candidates for if-conditional fission (e.g., via cost models 1460). Aspects presented herein may also provide a use of the cost model for successive/iterative if-conditional fission (e.g., via cost models 1460). Additionally, aspects presented herein may provide a use of the cost model as termination criteria of iterative fission (e.g., via cost models 1460).

Aspects presented herein may include a number of benefits or advantages. For instance, aspects presented herein may allow shader instructions to be terminated (i.e., terminated early) before any redundant computations. Aspects presented herein may do so by allowing compilers to schedule shader termination instructions early in a scheduling queue for graphics instructions. For example, aspects presented herein may contribute techniques for enabling compilers to schedule shader termination instructions earlier in the scheduling queue compared to other approaches. For instance, the ensuing reduction in the number of instructions executed by a shader before termination may allow aspects presented herein to yield significant performance benefits. Additionally, aspects presented herein may allow for a footprint reduction in the general purpose register, an improvement in wave size, a lower latency of memory accesses, and/or a power savings.

Figure 15:
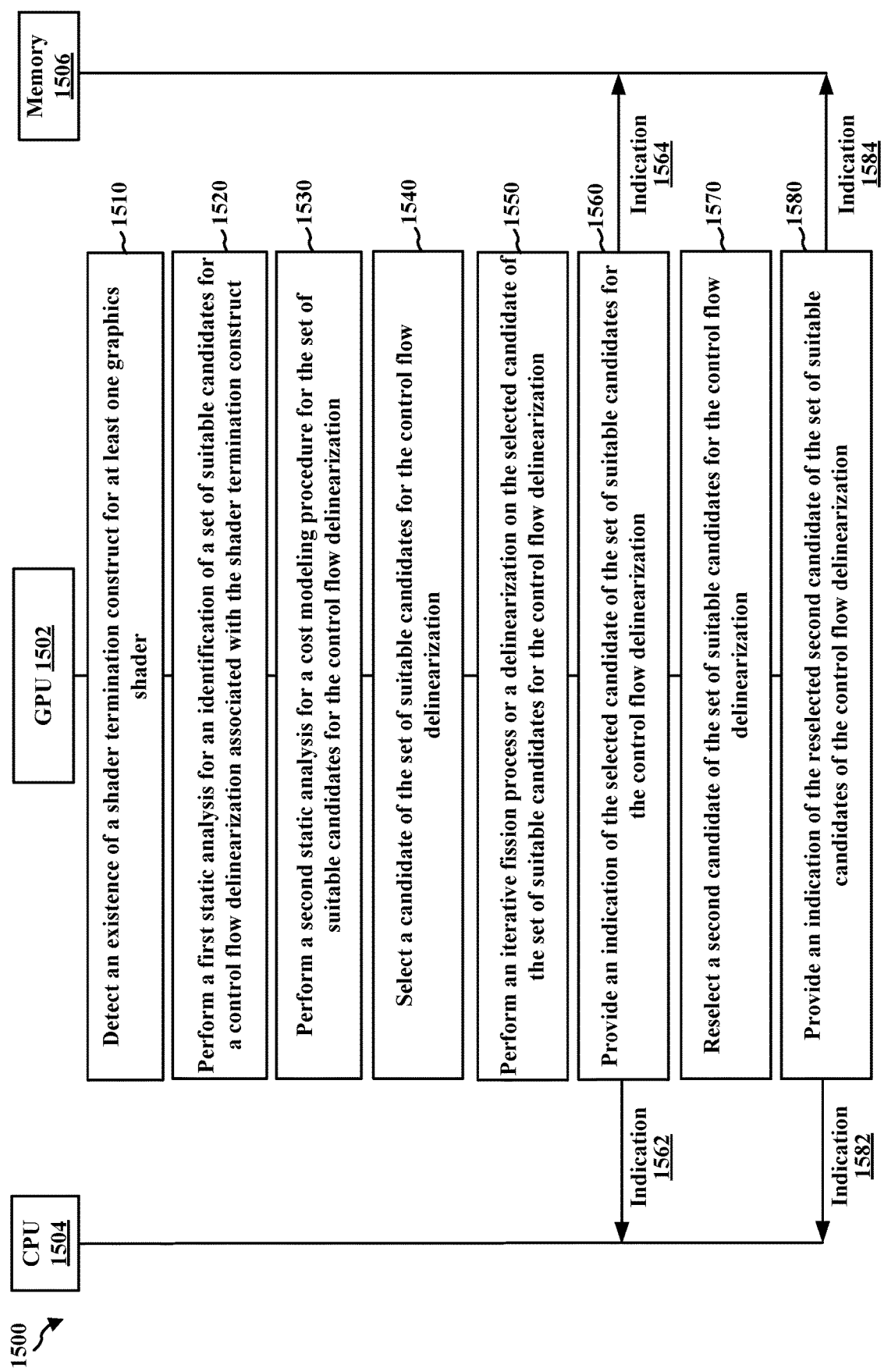
FIG. 15 is a communication flow diagram illustrating example communications between a GPU, a CPU, and a memory.

FIG. 15 is a communication flow diagram 1500 of graphics processing in accordance with one or more techniques of this disclosure. As shown in FIG. 15, diagram 1500 includes example communications between GPU 1502 (e.g., a GPU, a GPU component, a cache at a GPU, another graphics processor, a CPU, a CPU component, or another central processor), CPU 1504 (e.g., a CPU, a CPU component, a cache at a CPU, another central processor, a GPU, a GPU component, or another graphics processor), and memory 1506 (e.g., a system memory, a graphics memory, or a memory or cache at a GPU), in accordance with one or more techniques of this disclosure.

At 1510, GPU 1502 may detect an existence of a shader termination construct for at least one graphics shader. In some aspects, the shader termination construct may be at least one of: an operation associated with a shader termination for the at least one graphics shader, an application associated with the shader termination, code associated with the shader termination, or a set of instructions associated with the shader termination. Additionally, the operation associated with the shader termination may be at least one of: a discard operation, a termination operation, or an early termination operation. In some aspects, detecting the existence of the shader termination construct for the at least one graphics shader may include (e.g., comprise): detecting the existence of the shader termination construct for the at least one graphics shader in a graphics processing unit (GPU).

At 1520, GPU 1502 may perform a first static analysis for an identification of a set of suitable candidates for a control flow delinearization associated with the shader termination construct. In some instances, the control flow delinearization may be at least one of a control flow graph (CFG) delinearization, an aggressive control flow delinearization, or an aggressive CFG delinearization.

In some aspects, the control flow delinearization may be associated with a set of branch instructions in a computer graphics program including at least one of: a branch fission operation, a conditional fission operation, or an if-conditional fission operation. Also, the if-conditional fission operation may transform a first branch instruction including one or more eligible if-conditionals into a plurality of updated branch instructions over a first if-conditional, where each updated branch instruction in the plurality of updated branch instructions may employ a portion of the first if-conditional of the first branch instruction, where the one or more eligible if-conditionals in the first branch instruction may control an execution flow of the computer graphics program along one or more paths emanating from at least one branch instruction in the set of branch instructions, and where the set of branch instructions may include at least one of one or more if-then statements, one or more if-then-else statements, or one or more if-then-else-if statements in the computer graphics program. In some instances, the first if-conditional may be eligible for fission if a static analysis deems the first if-conditional and an associated branch instruction to satisfy at least one of: (1) the first if-conditional is in a canonical form, (2) the first if-conditional is uniform over a set of fibers in a wavefront, (3) a set of immediate successors of the associated branch instruction are free of side effects, (4) the set of immediate successors of the associated branch instruction are wave uniform, or (5) the one or more paths emanating from the associated branch instruction include the shader termination construct.

At 1530, GPU 1502 may perform a second static analysis for a cost modeling procedure for the set of suitable candidates for the control flow delinearization. In some aspects, performing the second static analysis for the cost modeling procedure may include (e.g., comprise): ranking each of the set of suitable candidates based on a profitability score of each of the set of suitable candidates. The selected candidate may include (e.g., comprise) a highest rank or a highest profitability score in the set of suitable candidates based on the cost modeling procedure. Also, each of the ranked set of suitable candidates may correspond to an eligible branch instruction in a set of branch instructions associated with the control flow delinearization. Additionally, in some aspects, performing the second static analysis for the cost modeling procedure may include (e.g., comprise): encoding a cost for each of the set of suitable candidates based on a set of characteristics of one or more if-conditionals in a set of suitable branch instructions associated with the control flow delinearization; and encoding a set of deemed benefits from the control flow delinearization for one or more selected hardware targets. Additionally, the cost modeling procedure may include at least one of: a set of heuristics, a profitability check, profile-driven information, an artificial intelligence (AI) procedure, or a machine learning (ML) procedure.

At 1540, GPU 1502 may select, based on the cost modeling procedure, a candidate of the set of suitable candidates for the control flow delinearization. In some aspects, the selected candidate may include (e.g., comprise) a highest rank or a highest profitability score in the set of suitable candidates based on the cost modeling procedure.

At 1550, GPU 1502 may perform an iterative fission process or a delinearization on the selected candidate of the set of suitable candidates for the control flow delinearization.

At 1560, GPU 1502 may provide an indication of the selected candidate of the set of suitable candidates for the control flow delinearization. In some aspects, providing the indication of the selected candidate may include: transmitting, to a component in a graphics processing unit (GPU) or a central processing unit (CPU), the indication of the selected candidate. For example, the GPU may transmit, to a component in a GPU or a CPU, the indication of the selected candidate (e.g., GPU 1502 may transmit indication 1562 to CPU 1504). Also, providing the indication of the selected candidate may include: storing, in a memory or a cache, the indication of the selected candidate. For example, the GPU may store, in a memory or a cache, the indication of the selected candidate (e.g., GPU 1502 may store indication 1564 in memory 1506).

At 1570, GPU 1502 may reselect, based on the selected candidate, a second candidate of the set of suitable candidates for the control flow delinearization based on the cost modeling procedure. In some aspects, the reselected second candidate may include a second-highest rank or a second-highest profitability score in the set of suitable candidates based on the cost modeling procedure.

At 1580, GPU 1502 may provide an indication of the reselected second candidate of the set of suitable candidates of the control flow delinearization. In some aspects, providing the indication of the reselected second candidate may include: transmitting, to a component in a graphics processing unit (GPU) or a central processing unit (CPU), the indication of the reselected second candidate. For example, the GPU may transmit, to a component in a GPU or a CPU, the indication of the reselected second candidate (e.g., GPU 1502 may transmit indication 1582 to CPU 1504). Also, providing the indication of the reselected second candidate may include: storing, in a memory or a cache, the indication of the reselected second candidate. For example, the GPU may store, in a memory or a cache, the indication of the reselected second candidate (e.g., GPU 1502 may store indication 1584 in memory 1506).

Figure 16:
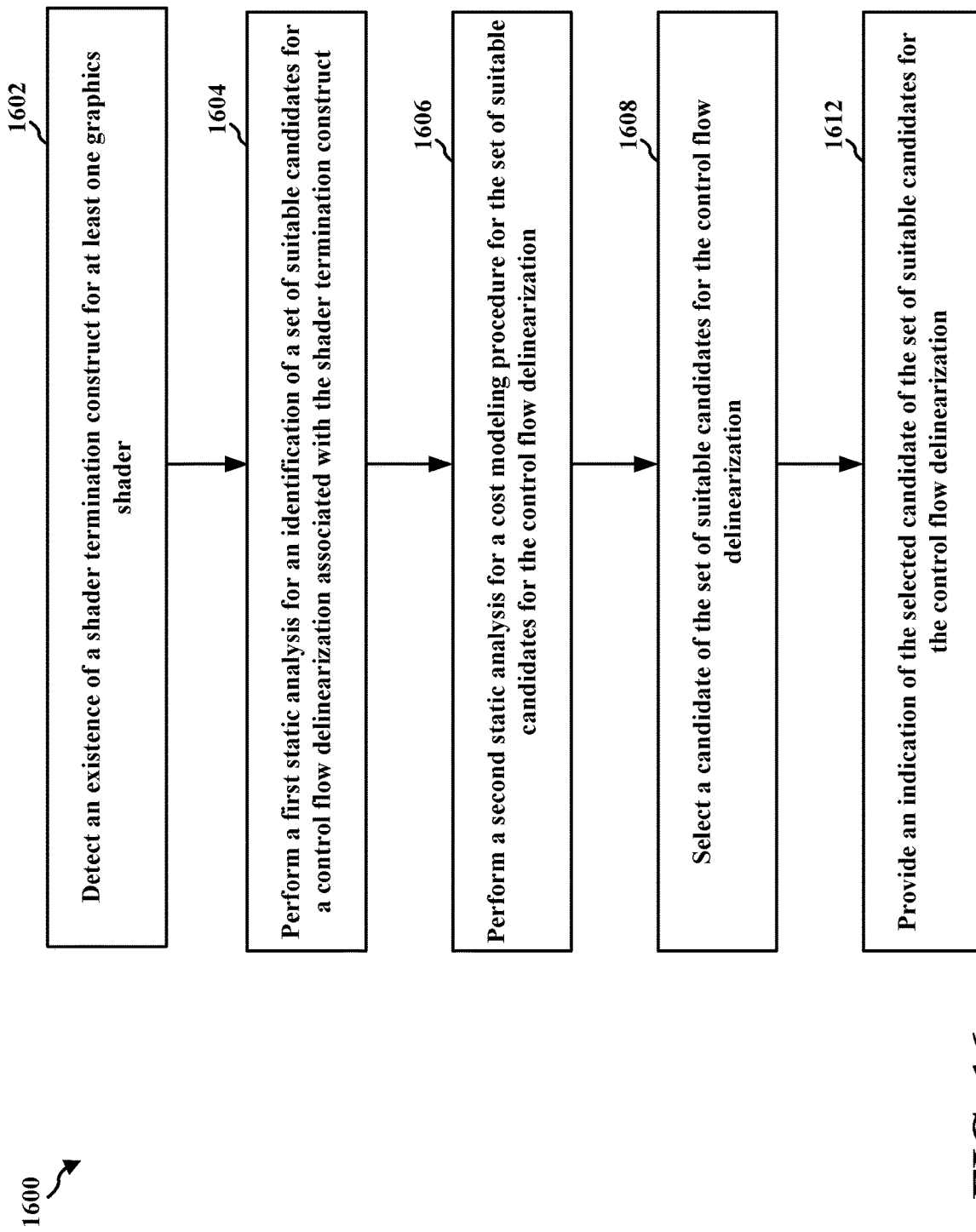
FIG. 16 is a flowchart of an example method of graphics processing.

FIG. 16 is a flowchart 1600 of an example method of graphics processing in accordance with one or more techniques of this disclosure. The method may be performed by a GPU (e.g., a GPU, a GPU component, a cache at a GPU, another graphics processor, a CPU, a CPU component, or another central processor), a CPU (e.g., a CPU, a CPU component, a cache at a CPU, another central processor, a GPU, a GPU component, or another graphics processor), a display driver integrated circuit (DDIC), an apparatus for graphics processing, a wireless communication device, and/or any apparatus that may perform graphics processing as used in connection with the examples of FIGS. 1-15.

At 1602, the GPU may detect an existence of a shader termination construct for at least one graphics shader, as described in connection with the examples in FIGS. 1-15. For example, as described in 1510 of FIG. 15, GPU 1502 may detect an existence of a shader termination construct for at least one graphics shader. Further, step 1602 may be performed by processing unit 120 in FIG. 1. In some aspects, the shader termination construct may be at least one of: an operation associated with a shader termination for the at least one graphics shader, an application associated with the shader termination, code associated with the shader termination, or a set of instructions associated with the shader termination. Additionally, the operation associated with the shader termination may be at least one of: a discard operation, a termination operation, or an early termination operation. In some aspects, detecting the existence of the shader termination construct for the at least one graphics shader may include: detecting the existence of the shader termination construct for the at least one graphics shader in a graphics processing unit (GPU).

At 1604, the GPU may perform a first static analysis for an identification of a set of suitable candidates for a control flow delinearization associated with the shader termination construct, as described in connection with the examples in FIGS. 1-15. For example, as described in 1520 of FIG. 15, GPU 1502 may perform a first static analysis for an identification of a set of suitable candidates for a control flow delinearization associated with the shader termination construct. Further, step 1604 may be performed by processing unit 120 in FIG. 1. In some instances, the control flow delinearization may be at least one of a control flow graph (CFG) delinearization, an aggressive control flow delinearization, or an aggressive CFG delinearization.

In some aspects, the control flow delinearization may be associated with a set of branch instructions in a computer graphics program including at least one of: a branch fission operation, a conditional fission operation, or an if-conditional fission operation. Also, the if-conditional fission operation may transform a first branch instruction including one or more eligible if-conditionals into a plurality of updated branch instructions over a first if-conditional, where each updated branch instruction in the plurality of updated branch instructions may employ a portion of the first if-conditional of the first branch instruction, where the one or more eligible if-conditionals in the first branch instruction may control an execution flow of the computer graphics program along one or more paths emanating from at least one branch instruction in the set of branch instructions, and where the set of branch instructions may include at least one of one or more if-then statements, one or more if-then-else statements, or one or more if-then-else-if statements in the computer graphics program. In some instances, the first if-conditional may be eligible for fission if a static analysis deems the first if-conditional and an associated branch instruction to satisfy at least one of: (1) the first if-conditional is in a canonical form, (2) the first if-conditional is uniform over a set of fibers in a wavefront, (3) a set of immediate successors of the associated branch instruction are free of side effects, (4) the set of immediate successors of the associated branch instruction are wave uniform, or (5) the one or more paths emanating from the associated branch instruction include the shader termination construct.

At 1606, the GPU may perform a second static analysis for a cost modeling procedure for the set of suitable candidates for the control flow delinearization, as described in connection with the examples in FIGS. 1-15. For example, as described in 1530 of FIG. 15, GPU 1502 may perform a second static analysis for a cost modeling procedure for the set of suitable candidates for the control flow delinearization. Further, step 1606 may be performed by processing unit 120 in FIG. 1. In some aspects, performing the second static analysis for the cost modeling procedure may include: ranking each of the set of suitable candidates based on a profitability score of each of the set of suitable candidates. The selected candidate may include a highest rank or a highest profitability score in the set of suitable candidates based on the cost modeling procedure. Also, each of the ranked set of suitable candidates may correspond to an eligible branch instruction in a set of branch instructions associated with the control flow delinearization. Additionally, in some aspects, performing the second static analysis for the cost modeling procedure may include: encoding a cost for each of the set of suitable candidates based on a set of characteristics of one or more if-conditionals in a set of suitable branch instructions associated with the control flow delinearization; and encoding a set of deemed benefits from the control flow delinearization for one or more selected hardware targets. Additionally, the cost modeling procedure may include at least one of: a set of heuristics, a profitability check, profile-driven information, an artificial intelligence (AI) procedure, or a machine learning (ML) procedure.

At 1608, the GPU may select, based on the cost modeling procedure, a candidate of the set of suitable candidates for the control flow delinearization, as described in connection with the examples in FIGS. 1-15. For example, as described in 1540 of FIG. 15, GPU 1502 may select, based on the cost modeling procedure, a candidate of the set of suitable candidates for the control flow delinearization. Further, step 1608 may be performed by processing unit 120 in FIG. 1. In some aspects, the selected candidate may include a highest rank or a highest profitability score in the set of suitable candidates based on the cost modeling procedure.

At 1612, the GPU may provide an indication of the selected candidate of the set of suitable candidates for the control flow delinearization, as described in connection with the examples in FIGS. 1-15. For example, as described in 1560 of FIG. 15, GPU 1502 may provide an indication of the selected candidate of the set of suitable candidates for the control flow delinearization. Further, step 1612 may be performed by processing unit 120 in FIG. 1. In some aspects, providing the indication of the selected candidate may include: transmitting, to a component in a graphics processing unit (GPU) or a central processing unit (CPU), the indication of the selected candidate. For example, the GPU may transmit, to a component in a GPU or a CPU, the indication of the selected candidate (e.g., GPU 1502 may transmit indication 1562 to CPU 1504). Also, providing the indication of the selected candidate may include: storing, in a memory or a cache, the indication of the selected candidate. For example, the GPU may store, in a memory or a cache, the indication of the selected candidate (e.g., GPU 1502 may store indication 1564 in memory 1506).

Figure 17:
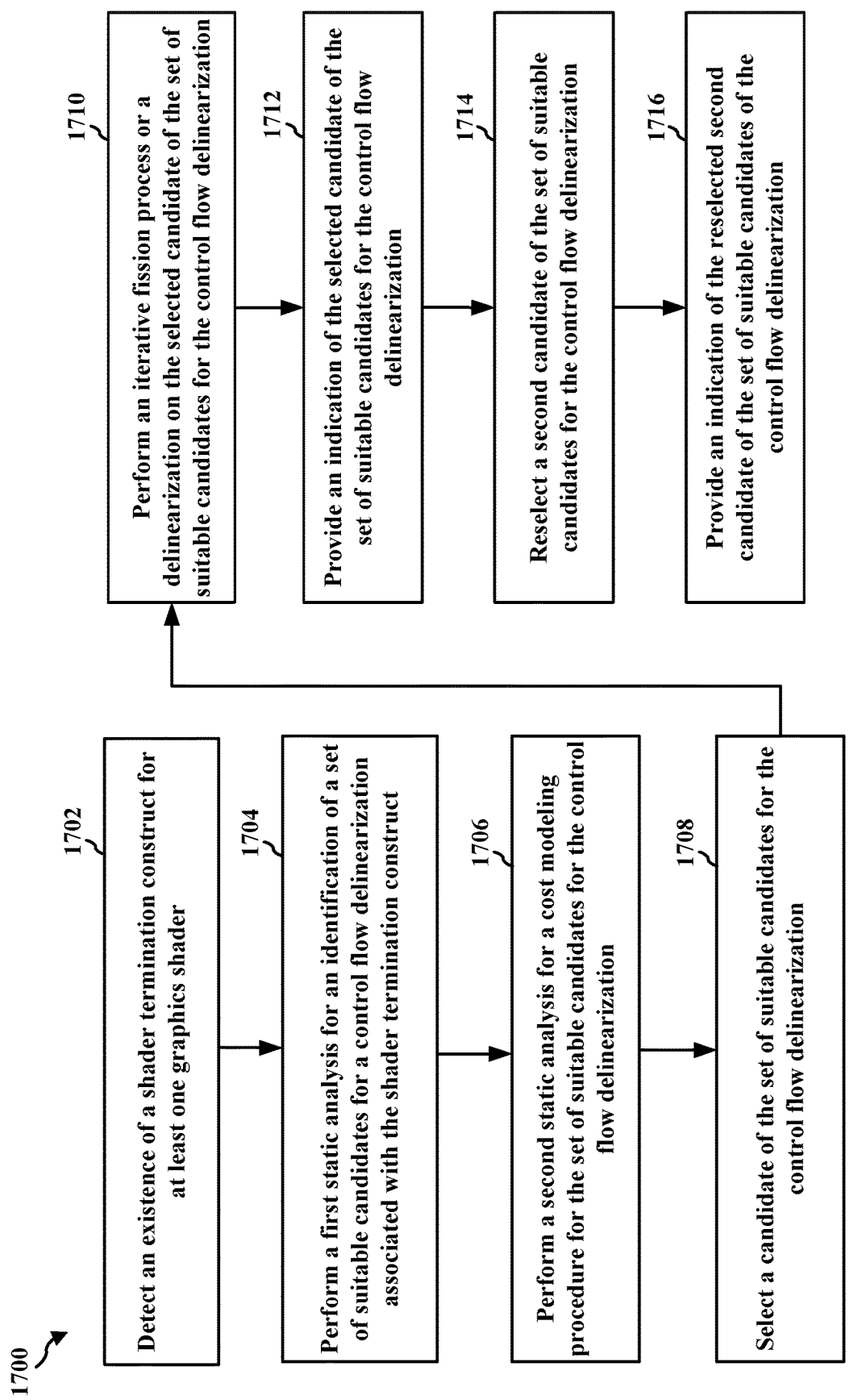
FIG. 17 is a flowchart of an example method of graphics processing.

FIG. 17 is a flowchart 1700 of an example method of graphics processing in accordance with one or more techniques of this disclosure. The method may be performed by a GPU (e.g., a GPU, a GPU component, a cache at a GPU, another graphics processor, a CPU, a CPU component, or another central processor), a CPU (e.g., a CPU, a CPU component, a cache at a CPU, another central processor, a GPU, a GPU component, or another graphics processor), a display driver integrated circuit (DDIC), an apparatus for graphics processing, a wireless communication device, and/or any apparatus that may perform graphics processing as used in connection with the examples of FIGS. 1-15.

At 1702, the GPU may detect an existence of a shader termination construct for at least one graphics shader, as described in connection with the examples in FIGS. 1-15. For example, as described in 1510 of FIG. 15, GPU 1502 may detect an existence of a shader termination construct for at least one graphics shader. Further, step 1702 may be performed by processing unit 120 in FIG. 1. In some aspects, the shader termination construct may be at least one of: an operation associated with a shader termination for the at least one graphics shader, an application associated with the shader termination, code associated with the shader termination, or a set of instructions associated with the shader termination. Additionally, the operation associated with the shader termination may be at least one of: a discard operation, a termination operation, or an early termination operation. In some aspects, detecting the existence of the shader termination construct for the at least one graphics shader may include: detecting the existence of the shader termination construct for the at least one graphics shader in a graphics processing unit (GPU).

At 1704, the GPU may perform a first static analysis for an identification of a set of suitable candidates for a control flow delinearization associated with the shader termination construct, as described in connection with the examples in FIGS. 1-15. For example, as described in 1520 of FIG. 15, GPU 1502 may perform a first static analysis for an identification of a set of suitable candidates for a control flow delinearization associated with the shader termination construct. Further, step 1704 may be performed by processing unit 120 in FIG. 1. In some instances, the control flow delinearization may be at least one of a control flow graph (CFG) delinearization, an aggressive control flow delinearization, or an aggressive CFG delinearization.

In some aspects, the control flow delinearization may be associated with a set of branch instructions in a computer graphics program including at least one of: a branch fission operation, a conditional fission operation, or an if-conditional fission operation. Also, the if-conditional fission operation may transform a first branch instruction including one or more eligible if-conditionals into a plurality of updated branch instructions over a first if-conditional, where each updated branch instruction in the plurality of updated branch instructions may employ a portion of the first if-conditional of the first branch instruction, where the one or more eligible if-conditionals in the first branch instruction may control an execution flow of the computer graphics program along one or more paths emanating from at least one branch instruction in the set of branch instructions, and where the set of branch instructions may include at least one of one or more if-then statements, one or more if-then-else statements, or one or more if-then-else-if statements in the computer graphics program. In some instances, the first if-conditional may be eligible for fission if a static analysis deems the first if-conditional and an associated branch instruction to satisfy at least one of: (1) the first if-conditional is in a canonical form, (2) the first if-conditional is uniform over a set of fibers in a wavefront, (3) a set of immediate successors of the associated branch instruction are free of side effects, (4) the set of immediate successors of the associated branch instruction are wave uniform, or (5) the one or more paths emanating from the associated branch instruction include the shader termination construct.

At 1706, the GPU may perform a second static analysis for a cost modeling procedure for the set of suitable candidates for the control flow delinearization, as described in connection with the examples in FIGS. 1-15. For example, as described in 1530 of FIG. 15, GPU 1502 may perform a second static analysis for a cost modeling procedure for the set of suitable candidates for the control flow delinearization. Further, step 1706 may be performed by processing unit 120 in FIG. 1. In some aspects, performing the second static analysis for the cost modeling procedure may include: ranking each of the set of suitable candidates based on a profitability score of each of the set of suitable candidates. The selected candidate may include a highest rank or a highest profitability score in the set of suitable candidates based on the cost modeling procedure. Also, each of the ranked set of suitable candidates may correspond to an eligible branch instruction in a set of branch instructions associated with the control flow delinearization. Additionally, in some aspects, performing the second static analysis for the cost modeling procedure may include: encoding a cost for each of the set of suitable candidates based on a set of characteristics of one or more if-conditionals in a set of suitable branch instructions associated with the control flow delinearization; and encoding a set of deemed benefits from the control flow delinearization for one or more selected hardware targets. Additionally, the cost modeling procedure may include at least one of: a set of heuristics, a profitability check, profile-driven information, an artificial intelligence (AI) procedure, or a machine learning (ML) procedure.

At 1708, the GPU may select, based on the cost modeling procedure, a candidate of the set of suitable candidates for the control flow delinearization, as described in connection with the examples in FIGS. 1-15. For example, as described in 1540 of FIG. 15, GPU 1502 may select, based on the cost modeling procedure, a candidate of the set of suitable candidates for the control flow delinearization. Further, step 1708 may be performed by processing unit 120 in FIG. 1. In some aspects, the selected candidate may include a highest rank or a highest profitability score in the set of suitable candidates based on the cost modeling procedure.

At 1710, the GPU may perform an iterative fission process or a delinearization on the selected candidate of the set of suitable candidates for the control flow delinearization, as described in connection with the examples in FIGS. 1-15. For example, as described in 1550 of FIG. 15, GPU 1502 may perform an iterative fission process or a delinearization on the selected candidate of the set of suitable candidates for the control flow delinearization. Further, step 1710 may be performed by processing unit 120 in FIG. 1.

At 1712, the GPU may provide an indication of the selected candidate of the set of suitable candidates for the control flow delinearization, as described in connection with the examples in FIGS. 1-15. For example, as described in 1560 of FIG. 15, GPU 1502 may provide an indication of the selected candidate of the set of suitable candidates for the control flow delinearization. Further, step 1712 may be performed by processing unit 120 in FIG. 1. In some aspects, providing the indication of the selected candidate may include: transmitting, to a component in a graphics processing unit (GPU) or a central processing unit (CPU), the indication of the selected candidate. For example, the GPU may transmit, to a component in a GPU or a CPU, the indication of the selected candidate (e.g., GPU 1502 may transmit indication 1562 to CPU 1504). Also, providing the indication of the selected candidate may include: storing, in a memory or a cache, the indication of the selected candidate. For example, the GPU may store, in a memory or a cache, the indication of the selected candidate (e.g., GPU 1502 may store indication 1564 in memory 1506).

At 1714, the GPU may reselect, based on the selected candidate, a second candidate of the set of suitable candidates for the control flow delinearization based on the cost modeling procedure, as described in connection with the examples in FIGS. 1-15. For example, as described in 1570 of FIG. 15, GPU 1502 may reselect, based on the selected candidate, a second candidate of the set of suitable candidates for the control flow delinearization based on the cost modeling procedure. Further, step 1714 may be performed by processing unit 120 in FIG. 1. In some aspects, the reselected second candidate may include a second-highest rank or a second-highest profitability score in the set of suitable candidates based on the cost modeling procedure.

At 1716, the GPU may provide an indication of the reselected second candidate of the set of suitable candidates of the control flow delinearization, as described in connection with the examples in FIGS. 1-15. For example, as described in 1580 of FIG. 15, GPU 1502 may provide an indication of the reselected second candidate of the set of suitable candidates of the control flow delinearization. Further, step 1716 may be performed by processing unit 120 in FIG. 1. In some aspects, providing the indication of the reselected second candidate may include: transmitting, to a component in a graphics processing unit (GPU) or a central processing unit (CPU), the indication of the reselected second candidate. For example, the GPU may transmit, to a component in a GPU or a CPU, the indication of the reselected second candidate (e.g., GPU 1502 may transmit indication 1582 to CPU 1504). Also, providing the indication of the reselected second candidate may include: storing, in a memory or a cache, the indication of the reselected second candidate. For example, the GPU may store, in a memory or a cache, the indication of the reselected second candidate (e.g., GPU 1502 may store indication 1584 in memory 1506).

In configurations, a method or an apparatus for graphics processing is provided. The apparatus may be a GPU (or other graphics processor), a CPU (or other central processor), a DDIC, an apparatus for graphics processing, and/or some other processor that may perform graphics processing. In aspects, the apparatus may be the processing unit 120 within the device 104, or may be some other hardware within the device 104 or another device. The apparatus, e.g., processing unit 120, may include means for detecting an existence of a shader termination construct for at least one graphics shader. The apparatus, e.g., processing unit 120, may also include means for performing a first static analysis for an identification of a set of suitable candidates for a control flow delinearization associated with the shader termination construct. The apparatus, e.g., processing unit 120, may also include means for performing a second static analysis for a cost modeling procedure for the set of suitable candidates for the control flow delinearization. The apparatus, e.g., processing unit 120, may also include means for selecting, based on the cost modeling procedure, a candidate of the set of suitable candidates for the control flow delinearization. The apparatus, e.g., processing unit 120, may also include means for providing an indication of the selected candidate of the set of suitable candidates for the control flow delinearization. The apparatus, e.g., processing unit 120, may also include means for performing an iterative fission process or a delinearization on the selected candidate of the set of suitable candidates for the control flow delinearization. The apparatus, e.g., processing unit 120, may also include means for reselecting, based on the selected candidate, a second candidate of the set of suitable candidates for the control flow delinearization based on the cost modeling procedure. The apparatus, e.g., processing unit 120, may also include means for providing an indication of the reselected second candidate of the set of suitable candidates of the control flow delinearization.

The subject matter described herein may be implemented to realize one or more benefits or advantages. For instance, the described graphics processing techniques may be used by a GPU, a CPU, a central processor, or some other processor that may perform graphics processing to implement the early termination of graphics shader techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize early termination of graphics shader techniques in order to improve memory bandwidth efficiency and/or increase processing speed at a GPU, a CPU, or a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing, including at least one memory and at least one processor coupled to the at least one memory and, based at least in part on information stored in the at least one memory, the at least one processor, individually or in any combination, is configured to: detect an existence of a shader termination construct for at least one graphics shader; perform a first static analysis for an identification of a set of suitable candidates for a control flow delinearization associated with the shader termination construct; perform a second static analysis for a cost modeling procedure for the set of suitable candidates for the control flow delinearization; select, based on the cost modeling procedure, a candidate of the set of suitable candidates for the control flow delinearization; and provide an indication of the selected candidate of the set of suitable candidates for the control flow delinearization.

Aspect 2 is the apparatus of aspect 1, where the control flow delinearization is associated with a set of branch instructions in a computer graphics program including at least one of: a branch fission operation, a conditional fission operation, or an if-conditional fission operation.

Aspect 3 is the apparatus of aspect 2, where the if-conditional fission operation transforms a first branch instruction including one or more eligible if-conditionals into a plurality of updated branch instructions over a first if-conditional, wherein each updated branch instruction in the plurality of updated branch instructions employs a portion of the first if-conditional of the first branch instruction, wherein the one or more eligible if-conditionals in the first branch instruction control an execution flow of the computer graphics program along one or more paths emanating from at least one branch instruction in the set of branch instructions, and wherein the set of branch instructions includes at least one of one or more if-then statements, one or more if-then-else statements, or one or more if-then-else-if statements in the computer graphics program.

Aspect 4 is the apparatus of aspect 3, where the first if-conditional is eligible for fission if a static analysis deems the first if-conditional and an associated branch instruction to satisfy at least one of: (1) the first if-conditional is in a canonical form, (2) the first if-conditional is uniform over a set of fibers in a wavefront, (3) a set of immediate successors of the associated branch instruction are free of side effects, (4) the set of immediate successors of the associated branch instruction are wave uniform, or (5) the one or more paths emanating from the associated branch instruction include the shader termination construct.

Aspect 5 is the apparatus of any of aspects 1 to 4, where to perform the second static analysis for the cost modeling procedure, the at least one processor, individually or in any combination, is configured to: rank each of the set of suitable candidates based on a profitability score of each of the set of suitable candidates.

Aspect 6 is the apparatus of aspect 5, where the selected candidate includes (e.g., comprises) a highest rank or a highest profitability score in the set of suitable candidates based on the cost modeling procedure.

Aspect 7 is the apparatus of any of aspects 5 to 6, where each of the ranked set of suitable candidates corresponds to an eligible branch instruction in a set of branch instructions associated with the control flow delinearization.

Aspect 8 is the apparatus of any of aspects 1 to 7, where to perform the second static analysis for the cost modeling procedure, the at least one processor, individually or in any combination, is configured to: encode a cost for each of the set of suitable candidates based on a set of characteristics of one or more if-conditionals in a set of suitable branch instructions associated with the control flow delinearization; and encode a set of deemed benefits from the control flow delinearization for one or more selected hardware targets.

Aspect 9 is the apparatus of any of aspects 1 to 8, where the at least one processor, individually or in any combination, is further configured to: perform an iterative fission process or a delinearization on the selected candidate of the set of suitable candidates for the control flow delinearization.

Aspect 10 is the apparatus of any of aspects 1 to 9, where the at least one processor, individually or in any combination, is further configured to: reselect, based on the selected candidate, a second candidate of the set of suitable candidates for the control flow delinearization based on the cost modeling procedure.

Aspect 11 is the apparatus of aspect 10, where the reselected second candidate comprises a second-highest rank or a second-highest profitability score in the set of suitable candidates based on the cost modeling procedure.

Aspect 12 is the apparatus of any of aspects 10 to 11, where the at least one processor, individually or in any combination, is further configured to: provide an indication of the reselected second candidate of the set of suitable candidates of the control flow delinearization.

Aspect 13 is the apparatus of any of aspects 1 to 12, where the control flow delinearization is at least one of a control flow graph (CFG) delinearization, an aggressive control flow delinearization, or an aggressive CFG delinearization.

Aspect 14 is the apparatus of any of aspects 1 to 13, where the cost modeling procedure includes at least one of: a set of heuristics, a profitability check, profile-driven information, an artificial intelligence (AI) procedure, or a machine learning (ML) procedure.

Aspect 15 is the apparatus of any of aspects 1 to 14, where the shader termination construct is at least one of: an operation associated with a shader termination for the at least one graphics shader, an application associated with the shader termination, code associated with the shader termination, or a set of instructions associated with the shader termination.

Aspect 16 is the apparatus of aspect 15, where the operation associated with the shader termination is at least one of: a discard operation, a termination operation, or an early termination operation.

Aspect 17 is the apparatus of aspect 16, where to provide the indication of the selected candidate, the at least one processor, individually or in any combination, is configured to: transmit, to a component in a graphics processing unit (GPU) or a central processing unit (CPU), the indication of the selected candidate.

Aspect 18 is the apparatus of aspect 16, where to provide the indication of the selected candidate, the at least one processor, individually or in any combination, is configured to: store, in a memory or a cache, the indication of the selected candidate.

Aspect 19 is the apparatus of any of aspects 1 to 18, where to detect the existence of the shader termination construct for the at least one graphics shader, the at least one processor, individually or in any combination, is configured to: detect the existence of the shader termination construct for the at least one graphics shader in a graphics processing unit (GPU).

Aspect 20 is the apparatus of any of aspects 1 to 23, where the apparatus is a wireless communication device further including (i.e., comprising): a transceiver coupled to the at least one processor, where to provide the indication of the selected candidate, the at least one processor, individually or in any combination, is configured to: provide, via the transceiver, the indication of the selected candidate.

Aspect 21 is a method of graphics processing for implementing any of aspects 1 to 20.

Aspect 22 is an apparatus for graphics processing including means for implementing any of aspects 1 to 20.

Aspect 23 is a computer-readable medium (e.g., a non-transitory computer-readable medium) storing computer executable code, the code when executed by at least one processor causes the at least one processor to implement any of aspects 1 to 20.

What is claimed is:
1. An apparatus for graphics processing, comprising:
at least one memory; and
at least one processor coupled to the at least one memory and, based at least in part on information stored in the at least one memory, the at least one processor, individually or in any combination, is configured to:
detect an existence of a shader termination construct for at least one graphics shader;
perform a first static analysis for an identification of a set of suitable candidates for a control flow delinearization associated with the shader termination construct;

perform a second static analysis for a cost modeling procedure for the set of suitable candidates for the control flow delinearization;

select, based on the cost modeling procedure, a candidate of the set of suitable candidates for the control flow delinearization; and provide an indication of the selected candidate of the set of suitable candidates for the control flow delinearization, wherein to perform the second static analysis for the cost modeling procedure, the at least one processor, individually or in any combination, is configured to:

encode a cost for each of the set of suitable candidates based on a set of characteristics of one or more if-conditionals in a set of suitable branch instructions associated with the control flow delinearization; and encode a set of deemed benefits from the control flow delinearization for one or more selected hardware targets.

2. The apparatus of claim 1, wherein the control flow delinearization is associated with a set of branch instructions in a computer graphics program including at least one of: a branch fission operation, a conditional fission operation, or an if-conditional fission operation.

3. The apparatus of claim 2, wherein the if-conditional fission operation transforms a first branch instruction including one or more eligible if-conditionals into a plurality of updated branch instructions over a first if-conditional, wherein each updated branch instruction in the plurality of updated branch instructions employs a portion of the first if-conditional of the first branch instruction, wherein the one or more eligible if-conditionals in the first branch instruction control an execution flow of the computer graphics program along one or more paths emanating from at least one branch instruction in the set of branch instructions, and wherein the set of branch instructions includes at least one of one or more if-then statements, one or more if-then-else statements, or one or more if-then-else-if statements in the computer graphics program.

4. The apparatus of claim 3, wherein the first if-conditional is eligible for fission if a static analysis deems the first if-conditional and an associated branch instruction to satisfy at least one of: (1) the first if-conditional is in a canonical form, (2) the first if-conditional is uniform over a set of fibers in a wavefront, (3) a set of immediate successors of the associated branch instruction are free of side effects, (4) the set of immediate successors of the associated branch instruction are wave uniform, or (5) the one or more paths emanating from the associated branch instruction include the shader termination construct.

5. The apparatus of claim 1, wherein to perform the second static analysis for the cost modeling procedure, the at least one processor, individually or in any combination, is configured to: rank each of the set of suitable candidates based on a profitability score of each of the set of suitable candidates.

6. The apparatus of claim 5, wherein the selected candidate comprises a highest rank or a highest profitability score in the set of suitable candidates based on the cost modeling procedure.

7. The apparatus of claim 5, wherein each of the ranked set of suitable candidates corresponds to an eligible branch instruction in a set of branch instructions associated with the control flow delinearization.

8. The apparatus of claim 1, wherein the at least one processor, individually or in any combination, is further configured to:

perform an iterative fission process or a delinearization on the selected candidate of the set of suitable candidates for the control flow delinearization.

9. The apparatus of claim 1, wherein the at least one processor, individually or in any combination, is further configured to:

reselect, based on the selected candidate, a second candidate of the set of suitable candidates for the control flow delinearization based on the cost modeling procedure.

10. The apparatus of claim 9, wherein the reselected second candidate comprises a second-highest rank or a second-highest profitability score in the set of suitable candidates based on the cost modeling procedure.

11. The apparatus of claim 9, wherein the at least one processor, individually or in any combination, is further configured to:

provide an indication of the reselected second candidate of the set of suitable candidates of the control flow delinearization.

12. The apparatus of claim 1, wherein the control flow delinearization is at least one of a control flow graph (CFG) delinearization, an aggressive control flow delinearization, or an aggressive CFG delinearization.

13. The apparatus of claim 1, wherein the cost modeling procedure includes at least one of: a set of heuristics, a profitability check, profile-driven information, an artificial intelligence (AI) procedure, or a machine learning (ML) procedure.

14. The apparatus of claim 1, wherein the shader termination construct is at least one of: an operation associated with a shader termination for the at least one graphics shader, an application associated with the shader termination, code associated with the shader termination, or a set of instructions associated with the shader termination.

15. The apparatus of claim 14, wherein the operation associated with the shader termination is at least one of: a discard operation, a termination operation, or an early termination operation.

16. The apparatus of claim 1, wherein to provide the indication of the selected candidate, the at least one processor, individually or in any combination, is configured to: transmit, to a component in a graphics processing unit (GPU) or a central processing unit (CPU), the indication of the selected candidate.

17. The apparatus of claim 1, wherein to provide the indication of the selected candidate, the at least one processor, individually or in any combination, is configured to: store, in a memory or a cache, the indication of the selected candidate.

18. The apparatus of claim 1, wherein the apparatus is a wireless communication device further comprising a transceiver coupled to the at least one processor, where to provide the indication of the selected candidate, the at least one processor, individually or in any combination, is configured to: provide, via the transceiver, the indication of the selected candidate, and wherein to detect the existence of the shader termination construct for the at least one graphics shader, the at least one processor, individually or in any combination, is configured to: detect the existence of the shader termination construct for the at least one graphics shader in a graphics processing unit (GPU).

19. A method of graphics processing, comprising:

detecting an existence of a shader termination construct for at least one graphics shader;

performing a first static analysis for an identification of a set of suitable candidates for a control flow delinearization associated with the shader termination construct;

performing a second static analysis for a cost modeling procedure for the set of suitable candidates for the control flow delinearization;

selecting, based on the cost modeling procedure, a candidate of the set of suitable candidates for the control flow delinearization; and providing an indication of the selected candidate of the set of suitable candidates for the control flow delinearization, wherein performing the second static analysis for the cost modeling procedure comprises:

encoding a cost for each of the set of suitable candidates based on a set of characteristics of one or more if-conditionals in a set of suitable branch instructions associated with the control flow delinearization; and encoding a set of deemed benefits from the control flow delinearization for one or more selected hardware targets.

20. The method of claim 19, wherein the control flow delinearization is associated with a set of branch instructions in a computer graphics program including at least one of: a branch fission operation, a conditional fission operation, or an if-conditional fission operation.

21. The method of claim 20, wherein the if-conditional fission operation transforms a first branch instruction including one or more eligible if-conditionals into a plurality of updated branch instructions over a first if-conditional, wherein each updated branch instruction in the plurality of updated branch instructions employs a portion of the first if-conditional of the first branch instruction, wherein the one or more eligible if-conditionals in the first branch instruction control an execution flow of the computer graphics program along one or more paths emanating from at least one branch instruction in the set of branch instructions, and wherein the set of branch instructions includes at least one of one or more if-then statements, one or more if-then-else statements, or one or more if-then-else-if statements in the computer graphics program.

22. The method of claim 21, wherein the first if-conditional is eligible for fission if a static analysis deems the first if-conditional and an associated branch instruction to satisfy at least one of: (1) the first if-conditional is in a canonical form, (2) the first if-conditional is uniform over a set of fibers in a wavefront, (3) a set of immediate successors of the associated branch instruction are free of side effects, (4) the set of immediate successors of the associated branch instruction are wave uniform, or (5) the one or more paths emanating from the associated branch instruction include the shader termination construct.

23. The method of claim 19, wherein performing the second static analysis for the cost modeling procedure comprises: ranking each of the set of suitable candidates based on a profitability score of each of the set of suitable candidates, wherein the selected candidate comprises a highest rank or a highest profitability score in the set of suitable candidates based on the cost modeling procedure, and wherein each of the ranked set of suitable candidates corresponds to an eligible branch instruction in a set of branch instructions associated with the control flow delinearization.

24. The method of claim 19, further comprising:

performing an iterative fission process or a delinearization on the selected candidate of the set of suitable candidates for the control flow delinearization.

25. The method of claim 19, further comprising:

reselecting, based on the selected candidate, a second candidate of the set of suitable candidates for the control flow delinearization based on the cost modeling procedure, wherein the reselected second candidate comprises a second-highest rank or a second-highest profitability score in the set of suitable candidates based on the cost modeling procedure.

26. The method of claim 25, further comprising:

providing an indication of the reselected second candidate of the set of suitable candidates of the control flow delinearization.

* * * * *